(12) United States Patent
Ito et al.

(10) Patent No.: US 12,196,899 B2
(45) Date of Patent: Jan. 14, 2025

(54) NEUTRON DETECTOR

(71) Applicant: JAPAN ATOMIC ENERGY AGENCY, Tokai-mura (JP)

(72) Inventors: Fumiaki Ito, Ibaraki (JP); Jaehong Lee, Tokai-mura (JP); Kota Hironaka, Sapporo (JP); Mitsuo Koizumi, Ibaraki (JP)

(73) Assignee: JAPAN ATOMIC ENERGY AGENCY, Tokai-mura (JP)

( * ) Notice: Subject to any disclaimer, the term of this patent is extended or adjusted under 35 U.S.C. 154(b) by 211 days.

(21) Appl. No.: 18/086,818

(22) Filed: Dec. 22, 2022

(65) Prior Publication Data

US 2023/0228890 A1 Jul. 20, 2023

(30) Foreign Application Priority Data

Dec. 28, 2021 (JP) ................. 2021-214537

(51) Int. Cl.
*G01T 3/06* (2006.01)
*G01T 3/02* (2006.01)

(52) U.S. Cl.
CPC . *G01T 3/06* (2013.01); *G01T 3/02* (2013.01)

(58) Field of Classification Search
CPC  G01T 1/003; G01T 1/006; G01T 1/10; G01T 1/16; G01T 1/1603; G01T 1/20; G01T 1/2004; G01T 1/2006; G01T 1/2008; G01T 1/2012; G01T 1/2018; G01T 1/2023; G01T 1/28; G01T 3/00; G01T 17/00
See application file for complete search history.

(56) References Cited

U.S. PATENT DOCUMENTS

| 2005/0224719 | A1 | 10/2005 | Polichar |
| 2008/0265171 | A1 | 10/2008 | Weissman et al. |
| 2016/0259070 | A1 | 9/2016 | Fukuda et al. |
| 2022/0120924 | A1* | 4/2022 | Chuirazzi ................. G01T 3/06 |

FOREIGN PATENT DOCUMENTS

| JP | 2008-014947 A | 1/2008 |
| WO | 2015064588 A1 | 5/2015 |
| WO | 2015131105 A1 | 9/2015 |

* cited by examiner

*Primary Examiner* — Don K Wong
(74) *Attorney, Agent, or Firm* — Hawaii Patent Services; Nathaniel K. Fedde; Kenton N. Fedde

(57) ABSTRACT

To obtain a neutron detector capable of measuring high dose neutrons with high neutron/gamma-ray discrimination ability and high efficiency.
A scintillator 10 has a layered structure in which a phosphor layer 11 and a light transmission layer 12 are alternately laminated in z direction. The phosphor layer 11 is made of a phosphor material emitting fluorescent light by absorbing neutrons, the material being, for example, a scintillator material used in neutron detectors having already been known. The light transmission layer 12 is made of a material highly transmitting fluorescent light emitted by the phosphor material and only slightly absorbing neutrons. In the scintillator 10, when neutrons and gamma-ray photons enter it, luminescence intensity (pulse height) due to neutrons is significantly different from that due to gamma-ray photons. It makes it easy to discriminate between outputs due to the two kinds of radiations.

12 Claims, 16 Drawing Sheets

NEUTRON DETECTOR

INCORPORATION BY REFERENCE

This application is based on and claims the benefit of priority from Japanese Patent Application No. 2021-214537 filed on Dec. 28, 2021, the contents of which are hereby incorporated by reference.

BACKGROUND

Technical Field

The present invention relates to a neutron detector that detects neutrons by detecting scintillation light emitted by the phosphor when absorbing the neutrons.

Background Art

When measuring the dose of neutrons by using a neutron detector in a high neutron dose condition, it is advantageous to use a detector with fast response and high detection efficiency, in order to reduce neutron count loss. However, in such an environment, it is often the case that not only the dose of neutrons but also that of gamma rays is high, in general. For example, when a neutron moderator material containing a large amount of hydrogen is used in an environment where the dose of fast neutrons is high, gamma rays of 2.2 MeV are generated by capture reaction of moderated neutrons with hydrogen, so that the dose of gamma rays necessarily becomes high. For this reason, there is a demand for a neutron detector with fast response and high detection efficiency that can detect neutrons by distinguishing them from gamma rays (can discriminate neutrons from gamma rays) even when both the dose of gamma rays and that of neutrons are high.

Since neutrons have no charge and accordingly have very high penetrating power compared to charged particles, it is usually necessary, for detection of slow neutrons, to use a detector that employs an isotope having a large cross-section of neutron absorption reaction accompanied by emission of high-energy secondary charged particles or the like (neutron-absorbing isotope) and is thereby increased in neutron absorption probability. Even in such a case of employing a neutron-absorbing isotope, in order to detect particularly neutrons of an energy equal to or higher than that of epithermal neutrons with sufficient sensitivity, it may be necessary to use a detector having a value of an order of several to several tens g/cm$^2$ in terms of density length corresponding to the product of density and thickness.

Generally used neutron detectors include a proportional counter that detects ionization of gas caused by its interaction with radiation, by amplifying the charge in proportion to the amount of ionization, and a scintillation detector that detects luminescence (fluorescence) depending on the amount of energy transfer by radiation in the scintillator by using a photodetector. Since these detectors have detection sensitivity also to gamma rays, when the sensitivity to neutrons is increased, the sensitivity to such gamma rays as described above corresponding to a background event also increases. Accordingly, a neutron detector capable of detecting neutrons by discriminating them from gamma rays is desired.

In the proportional counter, as described in Patent Document 1, for example, the ability of discrimination between neutrons and gamma rays (hereafter, referred to as n/γ discrimination ability can be increased when using $^3$He gas, which has a large neutron absorption reaction cross-section and hardly interacts with gamma rays because of its low atomic number. However, in that case, the height of pulses corresponding to the output is low until charges are charged to the proportional counter, and a time during which the detection is hard to be performed (resolution time) becomes long. When the resolution time is long, it becomes difficult, particularly in a high dose condition, to identify each individual one of temporally continuous output pulses, and correct counting accordingly becomes difficult. Further, to measure epithermal neutrons and fast neutrons with high efficiency, it becomes necessary to make the gas layer sufficiently thick (have a large density length), and there accordingly arises a problem in that the apparatus becomes large, or that the apparatus becomes expensive because $^3$He is expensive.

The scintillation detector is suitable for measurement in a high dose condition, because it uses a phosphor that emits fluorescent light by absorbing the energy of charged particles, where the above-described resolution time can be reduced by selection of the phosphor. For example, phosphors of the $^6$Li-glass:Ce$^{3+}$ family to which a neutron-absorbing isotope such as $^6$Li is added are widely used for neutron detection, because of their relatively fast decay time (about 60 nanoseconds) and moderate amount of luminescence due to thermal neutrons in terms of electron equivalent energy (MeVee) (about 1.6 MeVee). Here, the reason why the luminescence amount has been mentioned in terms of electron equivalent energy (MeVee) in the description just above is that even when the luminescence amount itself is large, if the luminescence amount due to gamma rays is also large, it results in mixture of signals for gamma rays and that for neutrons. Therefore, the electron equivalent energy is an important parameter for judging the n/γ discrimination ability. The n/Y discrimination ability can be increased by using a phosphor whose luminescence amount in terms of electron equivalent energy (MeVee) when absorbing neutrons is very large. As such a phosphor, for example, $^6$LiF/ZnS:Ag (electron equivalent energy of a thermal neutron of about 10 MeVee) to which a neutron-absorbing isotope such as $^6$Li is added is widely known. However, this phosphor has a relatively long decay time (about 200 nanoseconds) and additionally a very long decay time constant component, and accordingly has a problem in respect of fast response.

On the other hand, Patent Document 2 describes a scintillator with its n/γ discrimination ability increased by making an improvement in the structure. The scintillator has a configuration in which inorganic phosphor particles made of such a phosphor as described above are dispersed in a resin material. In this case, it is the same as in the above-described case that neutrons can be detected through fluorescent light emitted by the phosphor when absorbing the neutrons, but it is possible to reduce the intensity of fluorescent light emitted when absorbing the energy of gamma rays, compared to preceding cases where the scintillator is uniformly made of a phosphor. As a result, discrimination between neutrons and gamma rays becomes easy.

Citation List

[Patent Literature]
 [Patent Document 1] Japanese Patent Application Laid-Open No. 2008-14947
 [Patent Document 2] International Publication No. WO 2015/064588

SUMMARY OF INVENTION

Technical Problem

When $^6$LiF/ZnS:Ag is used as the phosphor, measurement in a high dose condition is difficult because the decay time constant of fluorescent light is long. Further, there is also a problem in that the efficiency of extracting the fluorescent light is reduced when a large crystal is used, because transmittance for the fluorescent light in this material is not high. On the other hand, while the $^6$Li-glass:Ce$^{3+}$ family enables measurement in a high dose condition, as described above, its luminescence amount in terms of MeVee is not sufficient, and its n/discrimination ability is low. For this reason, it has been difficult to realize a neutron detector capable of detecting neutrons with high n/r discrimination ability in a high dose condition only by setting of the phosphor material.

Therefore, in addition to such setting of phosphor material, it is effective to devise a scintillator structure as described in Patent Document 2. However, because of the difference in specific gravity between the inorganic phosphor particles and the resin material, it is not easy to uniformly disperse the inorganic phosphor particles in the resin material, and therefore the scintillator is not easy to fabricate. In addition, since the resin material contains a large amount of hydrogen whose mass is about the same as that of neutrons, neutrons are elastically scattered and thermalized, which increases the probability of absorption of the neutrons by other than the inorganic phosphor particles, thereby reducing the detection efficiency. Furthermore, such thermalization (scattering) causes increase in transit time of neutrons in the scintillator, which causes deterioration of temporal resolution of the detection in a case such as measuring neutron detection timing, and it accordingly is difficult to use the scintillator in, for example, a neutron time-of-flight (TOF) measurement requiring high temporal resolution.

For the above-described reasons, there has been desired a neutron detector capable of measuring a high dose of neutrons with high efficiency and with high n/γ discrimination ability.

The present invention has been made in view of the above-described problems, and is aimed at providing an invention that solves the problems.

Solution to Problem

The present invention is configured as follows, in order to solve the problems.

A neutron detector of the present invention is a neutron detector that detects neutrons by fluorescent light emitted when the neutrons are absorbed by a phosphor, the phosphor containing a neutron-absorbing isotope that emits secondary charged particles by absorbing the neutrons, where the neutron detector is characterized by its comprising: a scintillator configured to have a layered structure consisting of, along an incident direction of the neutrons, a plurality of combinations of a thin-film form phosphor layer made of the phosphor and a thin-film form light transmission layer made of a light transmitting material that transmits the fluorescent light and is adjacent to the phosphor layer in the thickness direction; and a photodetector configured to issue an output pulse as output generated on detecting the fluorescent light.

The neutron detector of the present invention is characterized by that the photodetector detects the fluorescent light emitted by the scintillator along the incident direction.

The neutron detector of the present invention is characterized by that the photodetector detects the fluorescent light emitted by the scintillator along an in-plane direction of the phosphor layers and the light transmission layers.

The neutron detector of the present invention is characterized by its comprising: as the photodetector, a first photodetector and a second photodetector opposing each other along the in-plane direction, with the scintillator inserted between them; and a coincidence counting unit configured to newly output, as the output pulse, an output based on a first output pulse corresponding to the output pulse from the first photodetector and a second output pulse corresponding to the output pulse from the second photodetector when synchronicity is recognized between the first and second output pulses.

The neutron detector of the present invention is characterized by that: in the scintillator, a plurality of segments each composed of a combination of the phosphor layer and the light transmission layer neighboring the phosphor layer and transmitting the fluorescent light emitted by the phosphor layer are formed along the incident direction, and, in the layered structure, a light shielding layer to shield the fluorescent light is provided between the segments neighboring each other in the incident direction so that the fluorescent light within a segment propagates in the in-plane direction but does not propagate between neighboring segments; and the photodetectors are provided in terms of each of the segments.

The neutron detector of the present invention is characterized by its comprising an anti-coincidence counting unit configured to output, among the output pulses from the respective segments, the output pulse whose synchronicity with other ones of the output pulses has not been recognized.

The neutron detector of the present invention is characterized by that a ratio of the light transmission layer to the phosphor layer in refractive index for the fluorescent light is in a range from 0.90 to 1.10.

The neutron detector of the present invention is characterized by that a main component of the phosphor layer and that of the light transmission layer are silicon dioxide (SiO$_2$), and the neutron-absorbing isotope is added in the phosphor layer.

The neutron detector of the present invention is characterized by that the neutron-absorbing isotope is $^6$Li or $^{10}$B.

The neutron detector of the present invention is characterized by that a density length corresponding to the product of density and thickness is set in a range from 0.0625 to 0.5 g/cm$^2$ and in a range from 0.2 to 1.3 g/cm$^2$, respectively, for the phosphor layer and the light transmission layer.

Advantageous Effects of Invention

Configured as described above, the present invention enables achieving a neutron detector capable of measuring a high dose of neutrons with high efficiency and with high n/γ discrimination ability.

DETAILED DESCRIPTION

A neutron detector according to each embodiment of the present invention is a scintillation detector for detecting neutrons. Accordingly, similarly to the neutron detector described in Patent Document 2, for example, and the like, it uses a scintillator that absorbs neutrons and thereby emits fluorescent light and a photodetector that detects the fluorescent light in combination. The present invention is characterized by a structure of the scintillator or by a form of combining the scintillator with the photodetector. Hereinafter, two embodiments distinguished based on the basic structure of the scintillator will be described.

First Embodiment

Figure 1A:
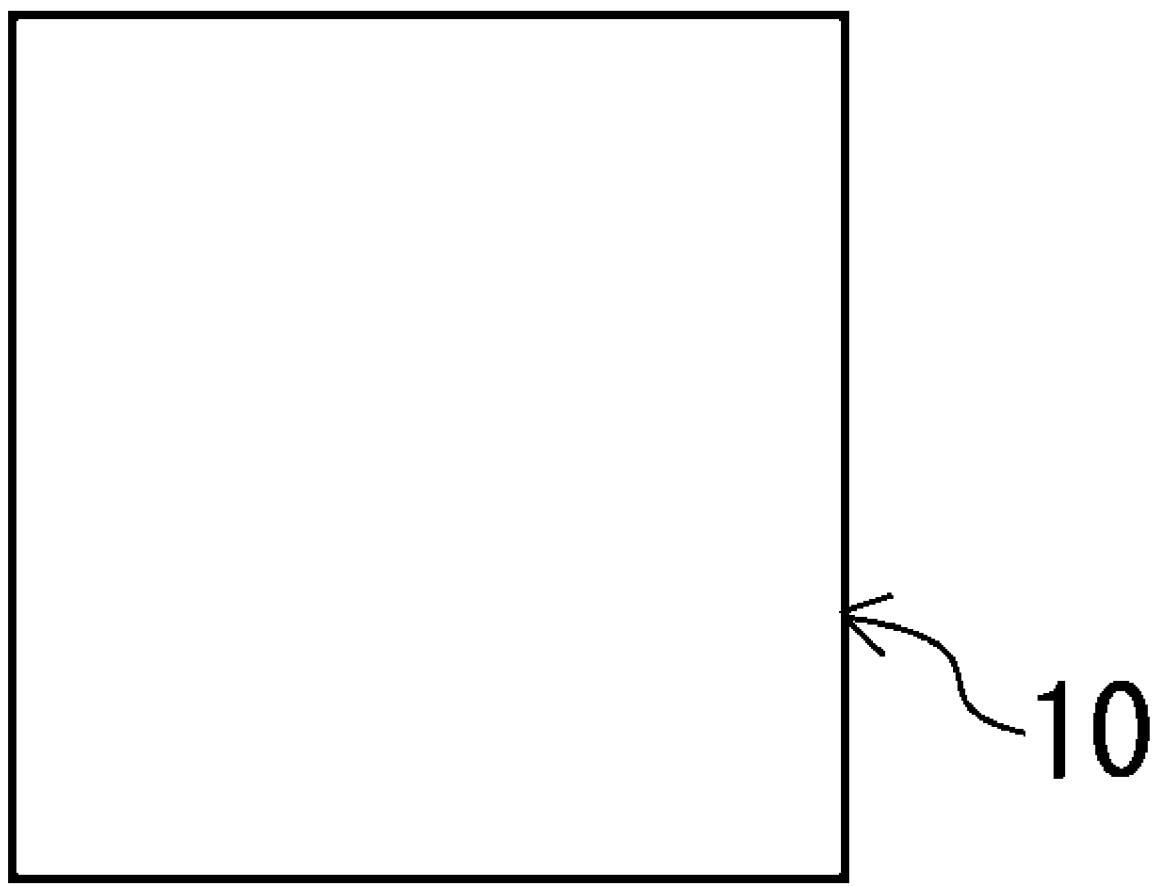
FIG. 1A is a plane view showing a structure of a scintillator used in a neutron detector according to a first embodiment of the present invention.
Figure 1B:
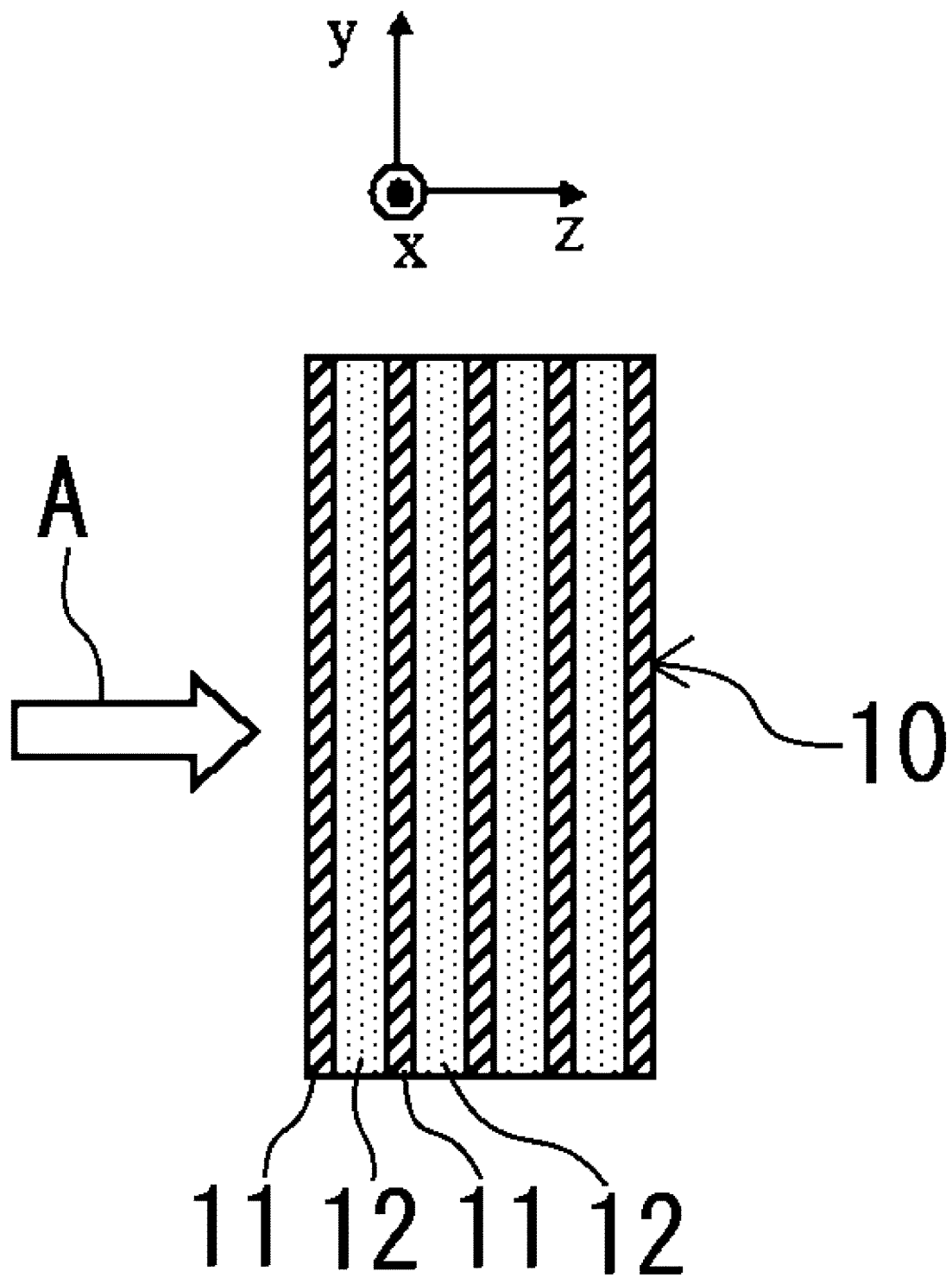
FIG. 1B is a cross-sectional view showing a structure of a scintillator used in a neutron detector according to a first embodiment of the present invention.

FIG. 1A shows a plan view representing a structure of a scintillator 10 used in a neutron detector according to a first embodiment, and FIG. 1B shows a cross-sectional view representing that. Here, neutrons to be detected enter the scintillator 10 from the negative side in the z direction in the diagrams. The scintillator 10 has a layered structure in which a phosphor layer 11 and a light transmission layer 12 are alternately laminated in the z direction. The phosphor layer 11 and the light transmission layer 12 each have a thin film form extending in the x- and y-directions in the diagrams. While five phosphor layers 11 and four light transmission layers 12 are provided in FIGS. 1A, 1B, the numbers of layers are appropriately set.

The phosphor layer 11 is made of a phosphor that emits fluorescent light by absorbing the energy of charged particles, and the charged particles can be detected by detecting the fluorescent light. Here, to make the phosphor have sensitivity particularly to neutrons having no charge, a phosphor to which a neutron-absorbing isotope is added is used, for example. Examples of such a phosphor are an already known scintillation glass for neutron detection as $^6$Li-glass:$Ce^{3+}$. Specifically, GS20, KG2 (manufactured by Scintacor) and the like are used. To obtain sufficient n/γ discrimination ability, the amount of luminescence caused by absorbing neutrons is preferably 1.5 MeVee or larger in terms of electron equivalent energy (MeVee). The light transmission layer 12 is made of a material having high transmittance for the fluorescent light emitted by the phosphor and absorbing neutrons only slightly. Further, it is also preferable that the light transmission layer 12 has a refractive index for the fluorescent light close to that of the phosphor layer 11, as will be described later, and is transparent to the fluorescent light, and materials preferably used to form the light transmission layer 12 include synthetic quartz, lead glass slightly containing lead oxide, and the like.

With such a configuration, the scintillator 10 is increased in n/γ discrimination ability in neutron detection, and highly efficient neutron detection can be performed with the increased n/γ discrimination ability. This point will be described below. In general, a phosphor forming a scintillator emits fluorescent light by absorbing the energy of charged particles. When the fluorescent light is detected by a photodetector (photomultiplier tube) or the like having high temporal resolution, photoelectrons are generated on the photocathode by the fluorescent light and are amplified, thereby producing a pulsed electrical output according to temporal distribution of the luminescence. The number of the photoelectrons corresponds to the luminescence intensity, which corresponds to the output pulse, so-called pulse height or an integrated charge value.

There, while there is a slight difference between neutrons and gamma rays in the output pulse waveform, caused by a difference in the form of energy transfer to the phosphor from them, it generally is not easy to distinguish between the output pulse produced by fluorescence at a time of neutron absorption and the output pulse produced by fluorescence at a time of energy transfer from gamma rays, in a case the amount of light (total photon number) is about the same for the two types of fluorescence. For example, even when the emission energy at a time of neutron absorption in the phosphor is 4.78 MeV, as will be described later, electron equivalent energy for the corresponding luminescence amount is about 1.6 MeVee in GS20 described above. On the other hand, for example, gamma rays of 2.2 MeV mainly undergo Compton scattering in the phosphor, where they transfer continuous energy of about 2.0 MeV and lower to electrons in the phosphor. Therefore, in a region where pulse heights due to the two types of fluorescence overlap each other, it is theoretically impossible to distinguish between the two types of fluorescence from the pulse heights. It is demanded to detect neutrons by discriminating them from gamma rays even in such a situation.

Figure 2:
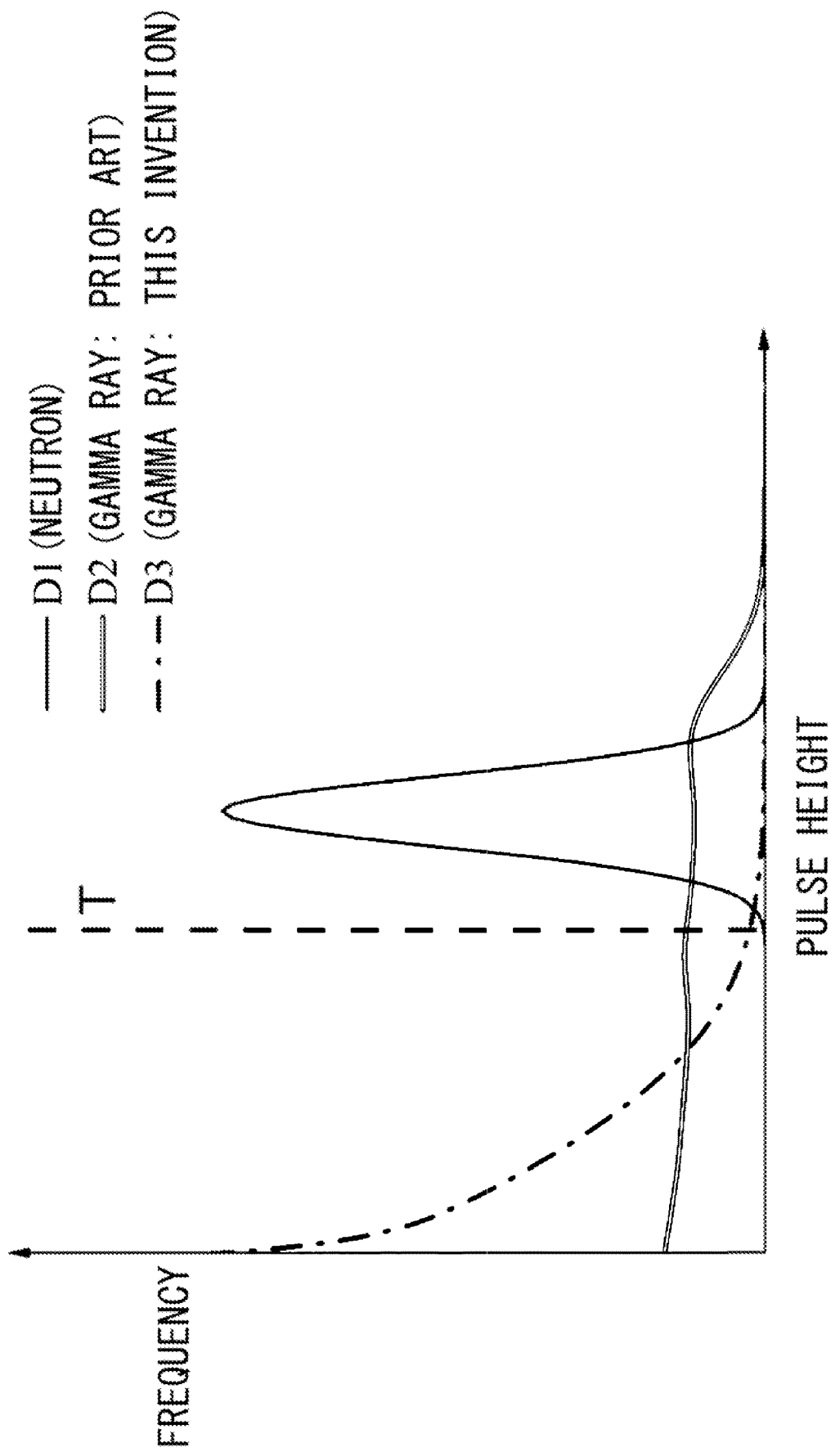
FIG. 2 is a diagram schematically showing pulse height distributions in cases of using a scintillator of prior art technology or that according to the present invention, where both neutrons and gamma rays are detected.

In this respect, the scintillator 10 of the present invention is configured to have a structure in which, when neutrons and gamma-ray photons are incident, luminescence intensity (pulse height) is largely different between the neutrons and the gamma-ray photons. Thereby, it becomes possible to easily discriminate between them from the pulse heights, First, a description will be given of output (pulse height distribution of output pulses) in a case where a general type of scintillator is used and both neutrons and gamma rays are present. FIG. 2 is a diagram schematically illustrating the situation. There, the horizontal axis represents pulse height of output pulses, which corresponds to energy absorbed by the phosphor from a single neutron or gamma-ray photon. The vertical axis represents detection frequency of neutrons or gamma-ray photons when they are detected in large numbers.

In FIG. 2, D1 is a pulse height distribution of output pulses due to neutrons in a case of using a usual scintillator whose entire body is made of a thick phosphor. Here, the peak energy of the distribution corresponds to a constant emission energy due to nuclear reaction between $^6$Li and neutrons, which will be described later, (electron equivalent energy of the luminescence amount is 1.6 MeVee in GS20, as described above). On the other hand, D2 is a pulse height distribution for gamma rays (2.2 MeV) when using the same scintillator. Here, in contrast to that D1 due to neutrons has a single peak as described above, the distribution due to gamma rays is a broad one, because gamma rays generate a continuous spectrum caused by Compton scattering and the like extending from near a maximum energy the gamma rays have toward the low energy side. As indicated here, it is difficult, in the region with overlap of D1 and D2, to distinguish (discriminate) between neutrons and gamma rays from only the pulse heights.

In general, a phosphor constituting the scintillator becomes luminous (emits fluorescent light) by absorbing energy of charged particles having sufficiently higher energy than that necessary to raise electrons in the phosphor from the ground state into the excited state. A wavelength of the luminescence corresponds to the energy difference between the excited state and the ground state, and photons having the luminescence wavelength are generated in numbers according to the energy absorbed by the phosphor and the amount of absorbed energy per unit length or the like.

Here, since gamma-ray photons transfer their energy to electrons in the phosphor by undergoing electromagnetic interaction with the electrons, the above-described charged particles are the electrons in that case, and fluorescent light is emitted by the electrons transferring their kinetic energy to the phosphor. At that time, the electrons ejected by gamma rays tend to progress in the forward direction according to the law of conservation of momentum, and in particular, the progressing direction of electrons having received a large amount of energy being closer to the pulse height due to neutrons becomes closer to the initial incident direction of the gamma rays.

In contrast, neutrons scarcely undergo electromagnetic interaction, and accordingly neutron absorption probability of general substances is low. However, when the phosphor contains a neutron-absorbing isotope that emits high-energy secondary charged particles by absorbing neutrons, high-energy secondary charged particles are generated by the neutron-absorbing isotope when absorbing neutrons. For example, when a well-known neutron-absorbing isotope $^6$Li is used, the reaction is as expressed by an equation (1).

[Equation 1]

$$n + {}^6\text{Li} \rightarrow \alpha + {}^3\text{H} + 4.78 \text{ MeV} \quad (1)$$

That is, the secondary charged particles in this case are α particles ($^4$He nuclei) and tritium ($^3$H nuclei), which have no direction dependence in their emission distribution, unlike electrons in the above-described gamma ray case, and are emitted in opposite directions while having kinetic energies of 2.05 MeV and 2.73 MeV respectively and totally about 4.78 MeV, according to the law of conservation of momentum. Subsequently, electrons in the phosphor are excited by the secondary charged particles, and fluorescent light is emitted in a similar way. It is the same for other neutron-absorbing isotopes (for example, $^{10}$B) that energy is transferred from secondary particles, while the secondary particles may be different in kind and energy from the above-described ones.

Figure 3:
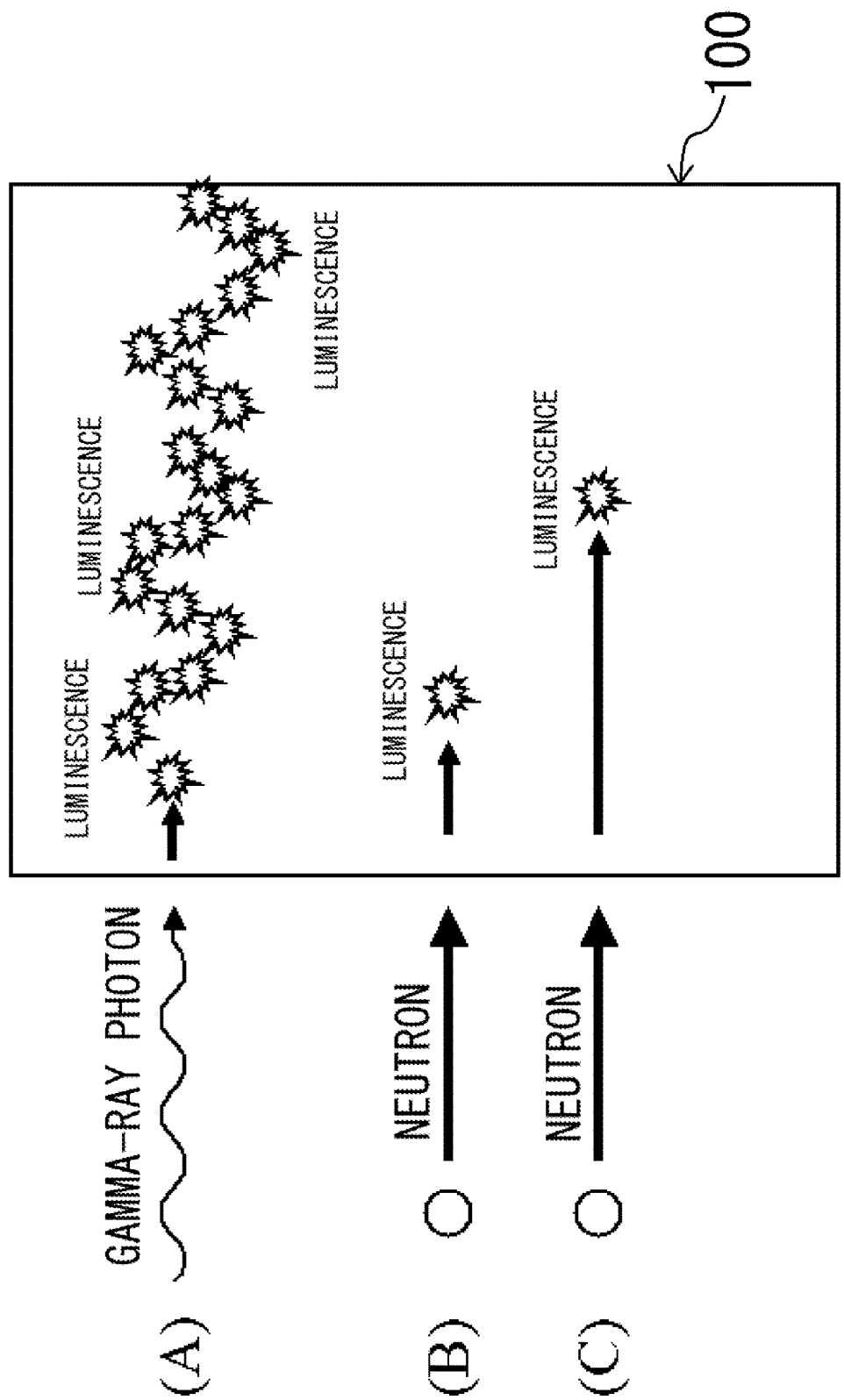
FIG. 3 is a diagram showing states of luminescence by interaction of gamma-ray photons (A) and neutrons (B) (C) in a phosphor.

Here, since [mass of secondary charged particle (nucleus)]>>[mass of electron] (for example, [mass of α particle]:[mass of electron]=7300:1), when they have almost the same energy, [velocity of secondary charged particle]<< [velocity of electron] stands. Accordingly, there arises a difference between the situation where electrons generated by gamma-ray photons cause luminescence in the phosphor and the situation where secondary charged particles generated by neutrons cause luminescence in the phosphor. FIG. 3 is a diagram schematically showing these situations. There, both gamma-ray photons and neutrons are assumed to be incident from the left side in the diagram.

In FIG. 3, (A) in a top row schematically shows a situation where high-energy electrons generated by gamma-ray photons transfer their energy and thereby cause luminescence in a scintillator 100 made of a thick phosphor. On the other hand, (B) in a middle row and (C) in a bottom row show similar situations for secondary charged particles generated by neutrons, in comparison. Here, the diagram is the one illustrating a region or the like of luminescence, but not the one illustrating the total amount of luminescence. In addition to the fact that the speed of electrons is higher than that of secondary charged particles, as described above, the charge amount of electrons is half that of α particles (secondary charged particles), for example. Since transfer energy per unit transit distance (dE/dx) of charged particles (electrons, secondary charged particles) is proportional to the product of transit time (inversely proportional to velocity) and square of the charge amount, [dE/dx of secondary charged particles]>> [dE/dx of electrons] stands. Accordingly, in the scintillator 100. [range of secondary charged particles]<<[range of electrons] stands, and for example, a maximum range of 1.5 MeV electrons in the above-described phosphor GS20 is about 2.5 mm. However, because the electrons are light (or have the same mass as electrons in the phosphor), they accordingly are easily scattered, have complicated routes, as depicted in FIG. 3 (A), and practically have a shorter range. When the scintillator 100 is thinner than the range of the electrons, the probability that the electrons cannot transfer all the energy to the scintillator 100 becomes high, and the pulse height is reduced compared to in a case the scintillator 100 is sufficiently thick.

On the other hand, since high-energy secondary charged particles generated by neutron absorption transfer a large amount of energy per unit transit distance, they need only a short distance for transferring all the energy, for example, several μm for α particles and several tens of μm for $^3$H, in the phosphor GS20.

Accordingly, when a neutron-absorbing isotope is contained in a phosphor, the thickness of the phosphor may be set at a level of enabling transfer of almost all kinetic energy of secondary charged particles in neutron absorption, and enabling immediate departure of high-energy electrons generated in interaction with gamma-ray photons. When the thickness is thus set, in FIG. 2, in contrast to that the pulse height distribution due to neutrons D1 ideally is maintained with no change, the pulse height distribution due to gamma rays changes from D2 to D3 present in the lower energy side. There, by setting a threshold value T between the distributions D1 and D3, it is possible to determine that neutrons have been detected when a detected pulse height is equal to or larger than T, and that the gamma rays have been detected when the pulse height is smaller than T.

Since, as described earlier, the progressing direction of high-energy electrons is substantially equal to the incident (progressing) direction of gamma rays, it is preferable, in order to enhance the above-described effect, that the incident direction of gamma rays is equal to the thickness direction of the phosphor when the phosphor is of a thin film form. In many of the cases where both neutrons and gamma rays are present, the neutron source and the gamma ray source overlap, and accordingly the condition is satisfied.

Since the probability of neutron absorption is not high, there may be a case, as shown in (B) in FIG. 3, where neutrons are absorbed near the surface and secondary charged particles are generated there, and there may be also a case, as shown in (C), where neutrons are absorbed at a deep position in the phosphor and secondary charged particles are generated there. When the phosphor is thin and composed of only a single layer, neutrons can be detected in the case of (B), but neutrons cannot be detected in a case of (C) corresponding to a case where neutrons pass through the phosphor without undergoing interaction, where the neutron detection efficiency may accordingly be reduced. In contrast, by employing a multilayer structure composed of phosphor layers 11 and light transmitting layers 12 as shown in FIG. 1B to maintain a total thickness of the phosphor layers 11, it becomes possible to detect neutrons even in the case of (C), and thereby keep a high neutron detection efficiency.

Figure 4:
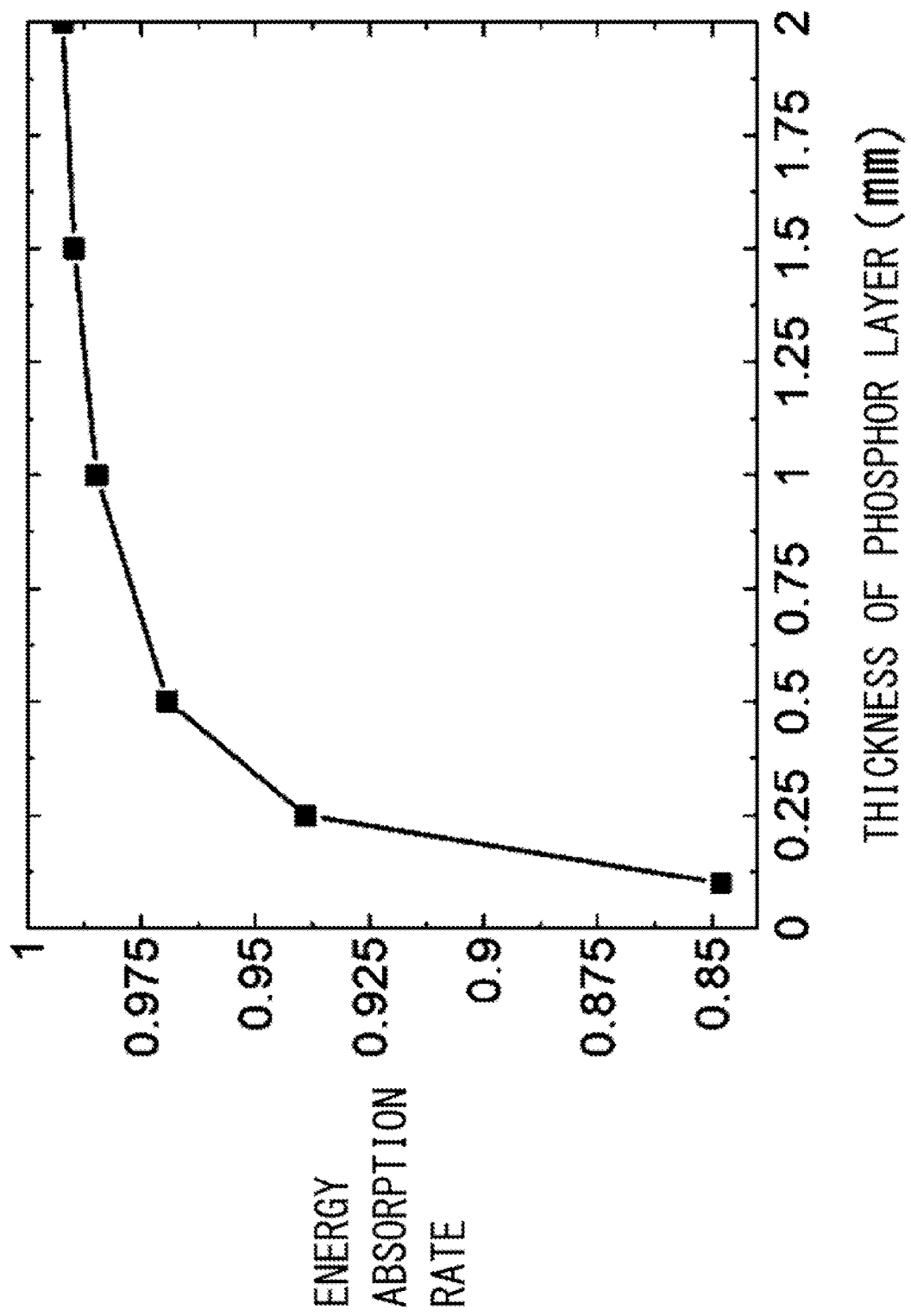
FIG. 4 shows a relationship between the absorption rate of energy of charged particles emitted by neutron absorption in a phosphor layer and thickness of the layer.

Hereinafter, a description will be given of a result of specific investigation performed to make clear the above-described matter. FIG. 4 shows a result of calculating the probability that most of the energy of secondary charged particles (α particles, $^3$H nuclei) generated by neutrons is absorbed in the phosphor. Here, it is assumed that the neutron-absorbing isotope is $^6$Li as described earlier, accordingly the secondary charged particles are α particles and $^3$H nuclei, and that the phosphor is GS20 already described. While the phosphor is preferred to be thick in order to sufficiently increase the absorption probability (to nearly 1), it is recognized from the result that the absorption rate is 0.98 when the phosphor thickness is 1.0 mm, about 0.94 even when the thickness is 0.25 mm, but is drastically reduced for smaller thicknesses.

On the other hand, as described earlier, the electron equivalent energy corresponding to the luminescence amount due to neutrons (secondary charged particles described above) when using GS20 is 1.6 MeVee. Accordingly, the pulse height in output becomes substantially the same for electrons having that energy and for secondary charged particles, it accordingly is impossible to discriminate between gamma rays and neutrons (or between high-energy electrons and secondary charged particles) by the pulse height, as indicated by D1 and D2 in FIG. 2.

To make it possible to discriminate between neutrons and gamma-ray photons generating electrons having the above-described level of energy by the pulse height of output pulses, the distribution of D3 in FIG. 2 can be realized by reducing the energy transferred from gamma rays (electrons generated by them) to the phosphor to be sufficiently smaller than 1.6 MeV. For example, a case considered here is that of using a general detector that is composed of a photomultiplier tube and the already-described GS20 phosphor (scintillator) whose energy resolution (a value obtained by dividing the peak value of a pulse height distribution by the full width of half maximum of the pulse height distribution) is about 16% for secondary charged particles and about 24% for electrons of 1.2 MeV. In this case, by setting T, in the pulse height distribution of FIG. 2, such that 99% of the distribution D1 for neutrons is included in a range equal to or larger than T, and making energy transfer caused by gamma rays in the phosphor layer 1.2 MeV or lower, almost no pulse height values for the gamma rays becomes included in the range equal to or larger than the threshold T, and accordingly the n/γ discrimination ability by the pulse height is increased. Therefore, the phosphor layer 11 may be made thin such that the transferred energy from electrons to the phosphor becomes 1.2 MeV or lower.

Figure 5:
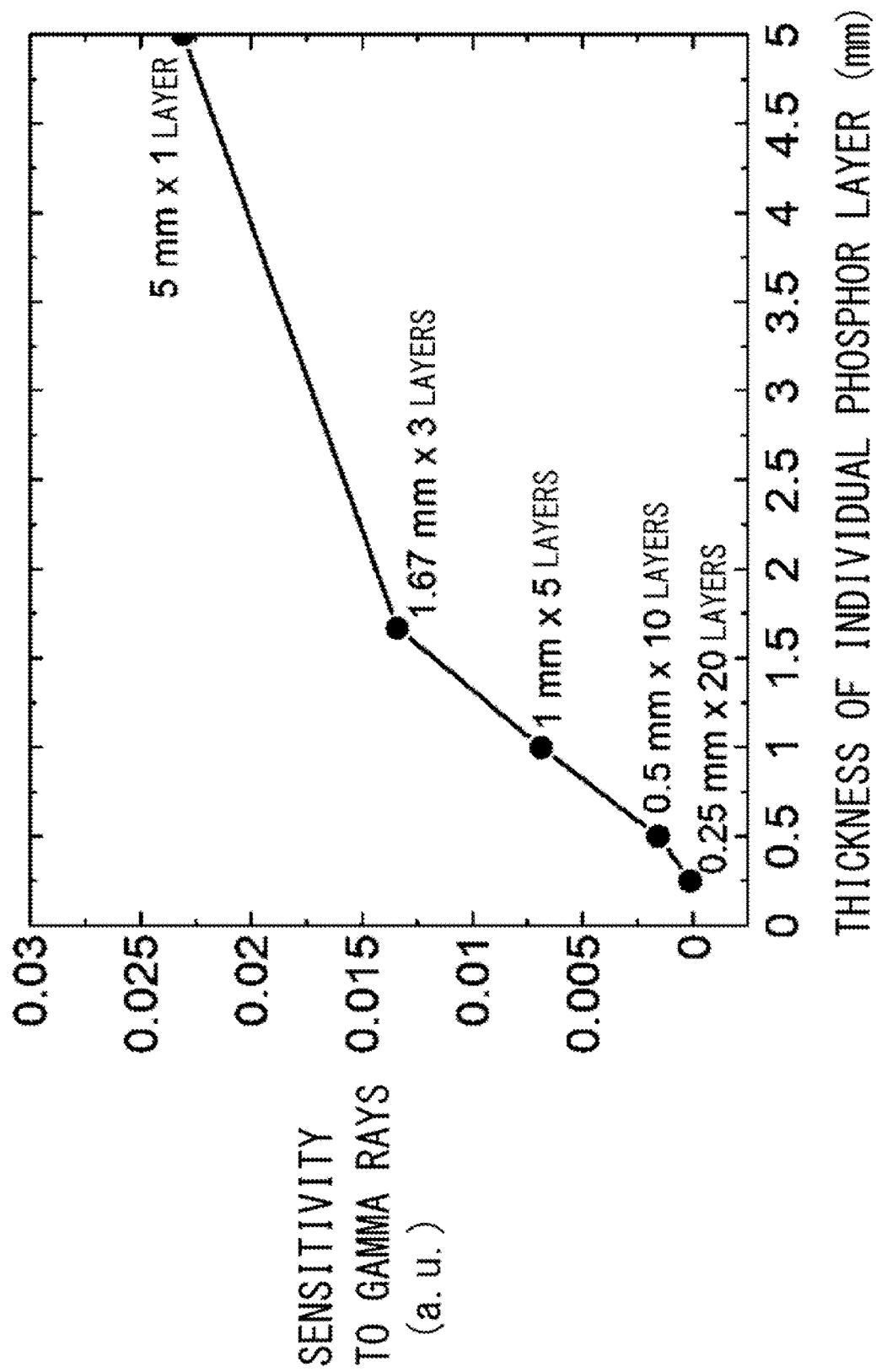
FIG. 5 shows a relationship between the sensitivity to 2.2 MeV gamma rays in a phosphor layer and thickness of the layer.

Since, as described earlier, the absorption probability of neutrons having an energy equal to or higher than that of epithermal neutrons, a total thickness of the phosphor layer 11 is required to be equal to or larger than a certain value in order to detect neutrons with high efficiency, and such a multilayer structure as shown in FIG. 1B is effective for this purpose. However, by adopting the multilayer structure, the probability of interaction with gamma rays is also increased, and even if their pulse height distribution is shifted toward the low energy side as described above, it may also occur that the frequency itself increases to cause increase in the sensitivity to gamma rays. For this reason, investigation was performed on the sensitivity to gamma rays (probability of transfer of energy exceeding 1.2 MeV to the phosphor) when the number of the phosphor layers 11 (and the thickness of individual layer) is varied, while keeping the total thickness constant. FIG. 5 shows a result of calculating relative values of the sensitivity to gamma rays when the total thickness of the phosphor layers 11 is fixed at 5 mm, and is distributed to a single layer (with a thickness of 5 mm), among three layers (with each individual phosphor layer 11 having a thickness of 1.67 mm), among 5 layers (with each individual layer 11 having a thickness of 1 mm), among 10 layers (with each individual layer 11 having a thickness of 0.5 mm), and among 20 layers (with each individual layer 11 having a thickness of 0.25 mm), where, in the multilayered cases, the light transmission layer 12 made of 2 mm thick synthetic quartz is inserted between the phosphor layers 11, thus forming the multilayer structure of FIGS. 1A, 1B. There, the energy of gamma rays was assumed to be 2.2 MeV corresponding to that to be emitted by reaction between moderated neutrons and hydrogen in the neutron moderator material, as described above. Such gamma rays of 2.2 MeV may be a major background event in various measurement conditions, and accordingly are one of gamma rays to which attention needs to be paid most in practical use.

In FIG. 5, the case of 5 mm thickness (single layer) corresponds to that of a usual scintillator entirely and uniformly made of a phosphor without having no light transmission layer 12. From FIG. 5, it is obvious that, by adopting the multilayer structure with the light transmission layers 12 inserted therein, the luminescence intensity due to gamma-ray photons can be substantially reduced compared to the usual scintillator.

The amount of electron energy absorption greatly depends on the product of the density and the thickness of the phosphor (referred to as density length). Therefore, to discuss the result more generally, it is preferable to use the density length obtained by multiplying the abscissa in FIG. 5 by the density of GS20 (2.5 g/cm$^3$) as an index, and discussing in that way, it is considered that even when a phosphor other than GS20 is used, a similar result to that on GS20 can be obtained by using a phosphor having an equivalent density length. For example, compared with a case of using a single phosphor layer 11 with a density length of 1.25 g/cm$^2$ (equivalent to 5 mm thick GS20), energy absorption is reduced by adopting the above-described layered structure including five phosphor layers 11 each with 0.25 g/cm$^2$ density length (equivalent to 1 mm thick GS20), where the rate of absorbing energy of 1.2 MeV or higher becomes about $\frac{1}{10}$. When the density length is used as the index, a preferred range of the density length of the phosphor layer 11 to obtain the above-described effect becomes 0.0625 to 0.5 g/cm$^2$.

As a result, even in cases where the total thickness of the phosphor layers 11 is identical, when the thickness of each individual phosphor layer 11 is made smaller and the total number of the layers is made larger, a difference between the pulse height of output pulses due to neutrons and that due to gamma-ray photons is increased.

However, if neutrons are absorbed in the light transmission layer 12, the neutrons are not detected because energy due to this reaction does not contribute to luminescence. As a result, in the scintillator 10 having the structure of FIGS. 1A, 1B, the neutron detection efficiency is reduced by an amount according to the neutron absorption in the light transmission layer 12. Therefore, it is desirable that a material having a low neutron absorption probability is used for the light transmission layer 12.

It accordingly is preferable that the light transmission layer 12 is made of a material not containing the neutron-absorbing isotope described earlier and being transparent to the fluorescent light. However, in a neutron detector that will be described later, fluorescent light extracted from the scintillator 10 is detected outside, where reflection at the interface between the phosphor layer 11 and the light transmission layer 12 becomes an obstacle in the extraction of the fluorescent light to the outside of the scintillator 10. To suppress such reflection at the interface, it is preferable that the refractive index of the phosphor layer 11 and that of the light transmission layer 12 is close to each other for the fluorescent light. Specifically, it is preferable that a rate of the refractive index of the light transmission layer 12 to that of the phosphor layer 11 is in a range from 0.90 to 1.10 at the wavelength of the fluorescent light. When, for example, the above-described GS20 is used for the phosphor layer 11, synthetic quartz may be used as a material satisfying the above-described requirement. That is, by using materials whose main component is silicon dioxide ($SiO_2$) as materials to form respective ones of the phosphor layer 11 and the light transmission layer 12, the reflection at the interface can be suppressed.

As has been described above, when using the scintillator 10 of FIGS. 1A, 1B, it is possible to significantly reduce only the pulse height of pulse output due to gamma-ray photons, without reducing that due to neutrons and the neutron detection efficiency. As a result, it becomes possible to discriminate between neutrons and gamma-ray photons only by the pulse height. Here, since the decay time constant of output pulses is determined by the material constituting the phosphor layer 11, and the decay time constant is not increased at least by employing the above-described configuration, use of a material having a small value for the decay time constant, for the phosphor layer 11, enables measurement in a high dose condition, similarly to usual scintillators.

Figure 6A:
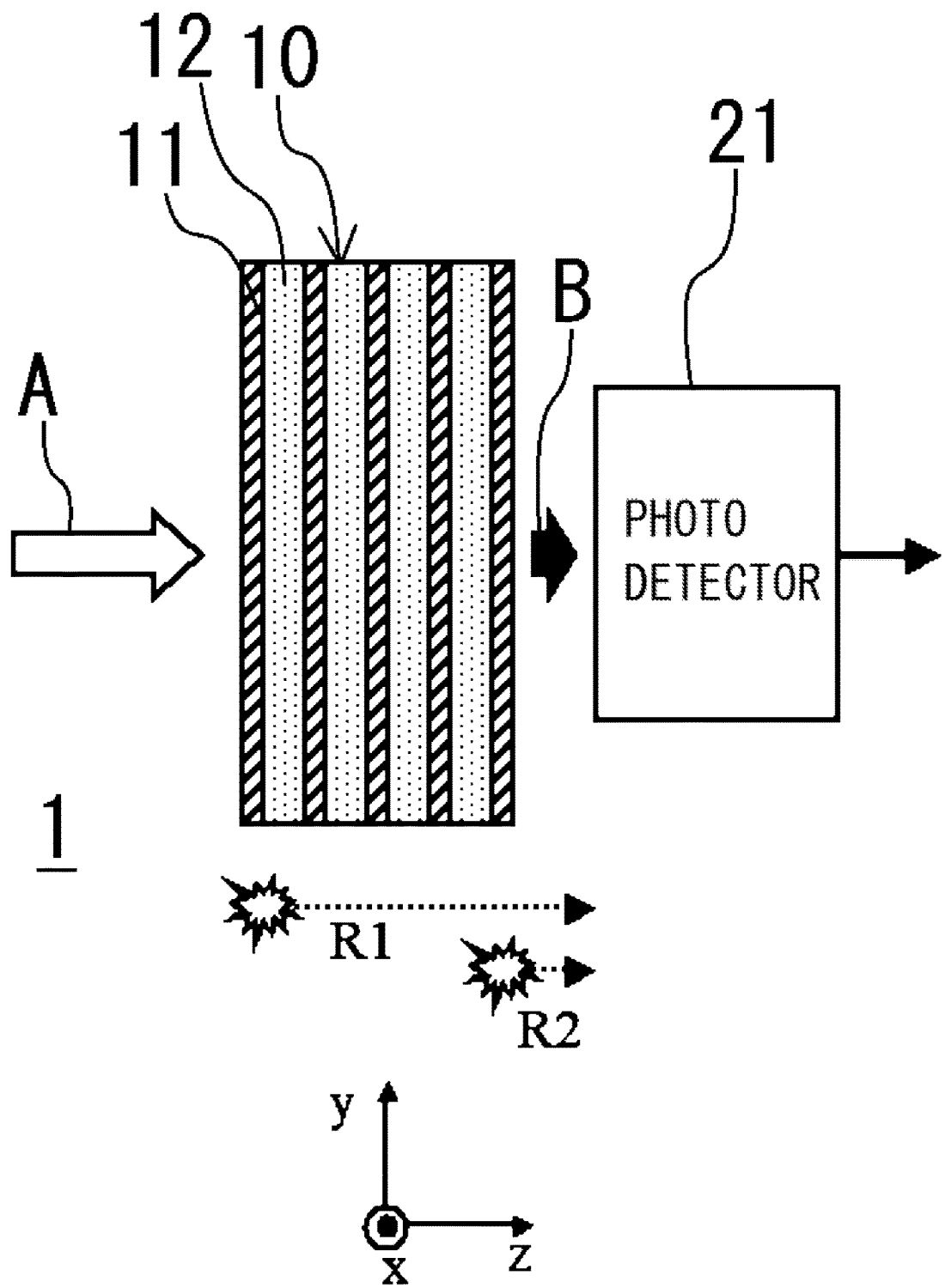
FIG. 6A is a diagram showing two types of configurations of a neutron detector (first example) according to the first embodiment.
Figure 6B:
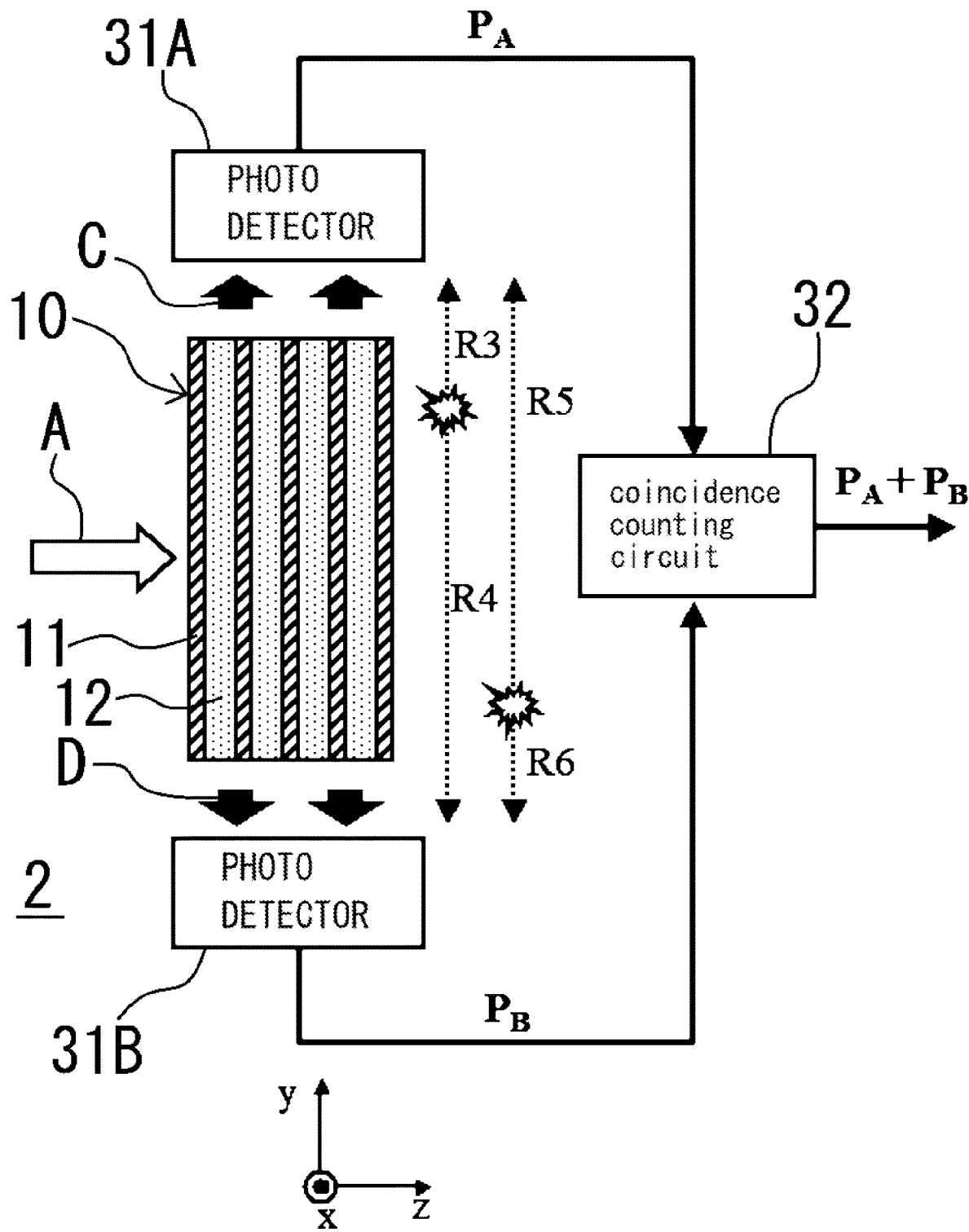
FIG. 6B is a diagram showing two types of configurations of a neutron detector (second example) according to the first embodiment.

Next, a description will be given of an aspect of practically using the scintillator 10 in a detector. FIGS. 6A and 6B schematically show two types of neutron detectors 1 and 2 in which the above-described scintillator 10 is used. In the diagrams, an arrow A represents the incident direction of neutrons to detect or of gamma rays to be an obstacle to neutron detection, and arrows B, C and D represent the progressing directions of respective portions of fluorescent light emitted by neutrons or gamma rays in the scintillator 10 that are to be detected by a photodetector.

A photodetector used here is the one having high temporal resolution and being capable of issuing output pulses by receiving the above-described fluorescent light emitted by the phosphor layer 11, and specifically is a photomultiplier tube or the like.

In the neutron detector 1 of FIG. 6A, both the incident direction of neutrons (arrow A) and that of light to be detected by the photodetector 21 (arrow B) are set to be in the layering direction in FIG. 1B (z-axis direction). Accordingly, when the scintillator 10 is of a planar shape extending in the x-y plane in FIGS. 1A, 1B, the configuration can be implemented particularly easily.

While the single photodetector 21 is used in FIG. 6A, a multi-channel photodetector or the like may be used with respect to the x-y plane of FIGS. 1A, 1B. In that case, neutron absorption positions (luminescence positions) in the x-y plane of the scintillator 10 can be recognized with a resolution nearly equal to the channel interval of the photodetector. There, as well as the photodetector, the scintillator 10 may be similarly arranged in a divided form.

As shown by (B) and (C) in FIG. 3, positions at which neutron absorption occurs vary in depth owing to a not high probability of neutron absorption, and accordingly in the present case, the phosphor layers 11 and the light transmission layers 12 are configured into the multilayer structure, as described above. In FIG. 6A, fluorescent light emitted by the phosphor layer 11 on the most surface side (the leftmost side in FIG. 6A) reaches the photodetector 21 after passing through all the layers located closer to the photodetector 21 than the phosphor layer 11 is (four light transmission layers 12 and four phosphor layers 11), as indicated by a path R1. In contrast, fluorescent light emitted by the phosphor layer 11 on the closest side to the photodetector 21 (the rightmost side) reaches the photodetector 21 directly at a short distance, as indicated by a path R2. As a result, when absorption, decay, and reflection between layers of fluorescent light cannot be neglected in the phosphor layers 11 and the light transmission layers 12, the former fluorescent light is detected as having a lower intensity (lower pulse height) than the latter one in the photodetector 21. For this reason, even when the same energy is transferred, the luminescence intensity to be detected (pulse height) may differ depending on in which phosphor layer 11 in FIG. 1B the energy is transferred. This broadens D1 in FIG. 2 in the lateral direction.

Figure 7:
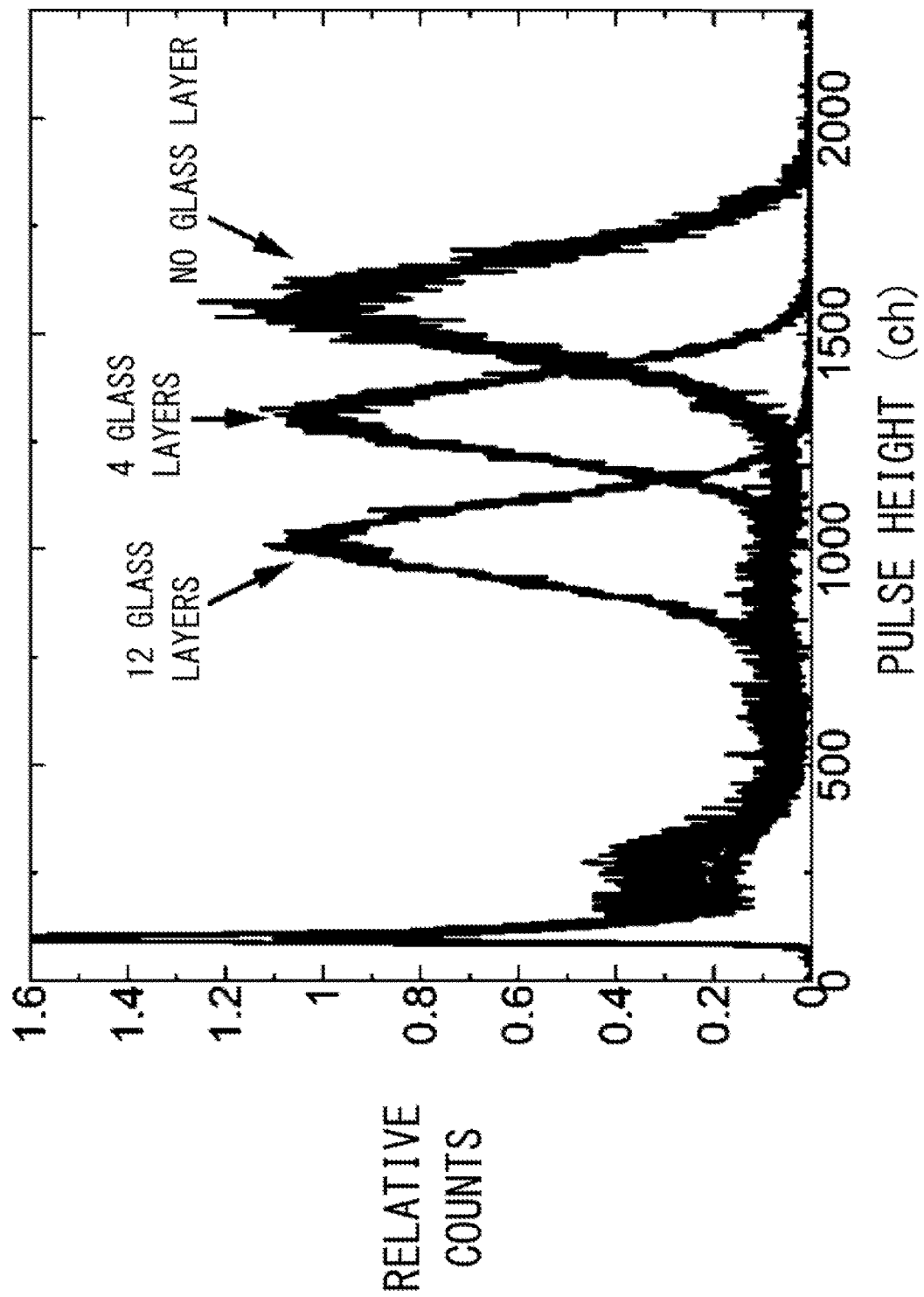
FIG. 7 shows a result of actual measurement of pulse height distributions depending on the number of light transmission layers through which fluorescent light passes.

FIG. 7 shows a result of practically measuring the influence of the light transmission layer 12 in such detection of fluorescent light. It is a result of measuring pulse height distributions in output of the photodetector 21 corresponding to D1 in FIG. 2, by using the configuration of FIG. 6A, where, for the purpose of investigating the influence, only the leftmost one of the phosphor layers 11 illustrated in FIG. 1B was provided, with no other ones of the phosphor layers 11 being provided, and the number of the light transmission layers 12 provided on the right side of the single phosphor layer 11 was varied. There, the difference in the number of the light transmission layers 12 causes a difference in influence of the total thickness of light transmission layers which the fluorescent light is to pass through, and of reflection between the layers, and the like. There, the light transmission layers 12 were made of synthetic quartz, and the thickness of each individual layer was set at 2.5 mm. In FIG. 7, a case represented by "NO GLASS LAYER" corresponds to that where fluorescent light emitted by the phosphor layer 11 reaches the photodetector 21 without passing through any light transmission layer 12, and cases represented by "4 GLASS LAYERS" and "12 GLASS LAYERS" correspond to, respectively, that with four light transmission layers 12 (with 10 mm total thickness) provided therein, and that with twelve light transmission layers 12 (with 30 mm total thickness) provided therein. From this result, it is noticed that even when using such a material exhibiting sufficiently high light transmittance as synthetic quartz, a decrease in the detected pulse height is not negligible. When the scintillator 10 having the structure of FIG. 1B is used in FIG. 6A, from which phosphor layer 11 the fluorescent light detected by the photodetector 21 was emitted is variable, which causes variation in the number (total thickness) of layers the fluorescent light passed through, and as a result, a pulse height distribution practically obtained by the photodetector 21 becomes the sum of the pulse distributions shown in FIG. 7. In such a case, even when broadening of the pulse distribution (full width of half maximum) shown in FIG. 7 is small for each individual phosphor layer, broadening of the summed pulse height distribution is thus increased. This is undesirable in respect of making the distributions D1 and D3 in FIG. 2 apart from each other.

Accordingly, in the case of the configuration of FIG. 6A, it is particularly preferable that the light transmittance is high for the phosphor layer 11 and the light transmission layer 12 and the reflectance at the interface of these layers is low (the difference in refractive index is small between the layers). Further, it is preferable not to increase the total number of laminated layers more than necessary.

Thus, as an influence of the light transmission layer 12 on the detection of fluorescent light by the photodetector 21, variation of the pulse height distribution in neutron detection depending on the number of light transmission layers 12 which the fluorescent light is to pass through has been shown in FIG. 7. Next, a description will be given of the sensitivity to gamma rays when the thickness of the light transmission layer 12 is varied.

Figure 8:
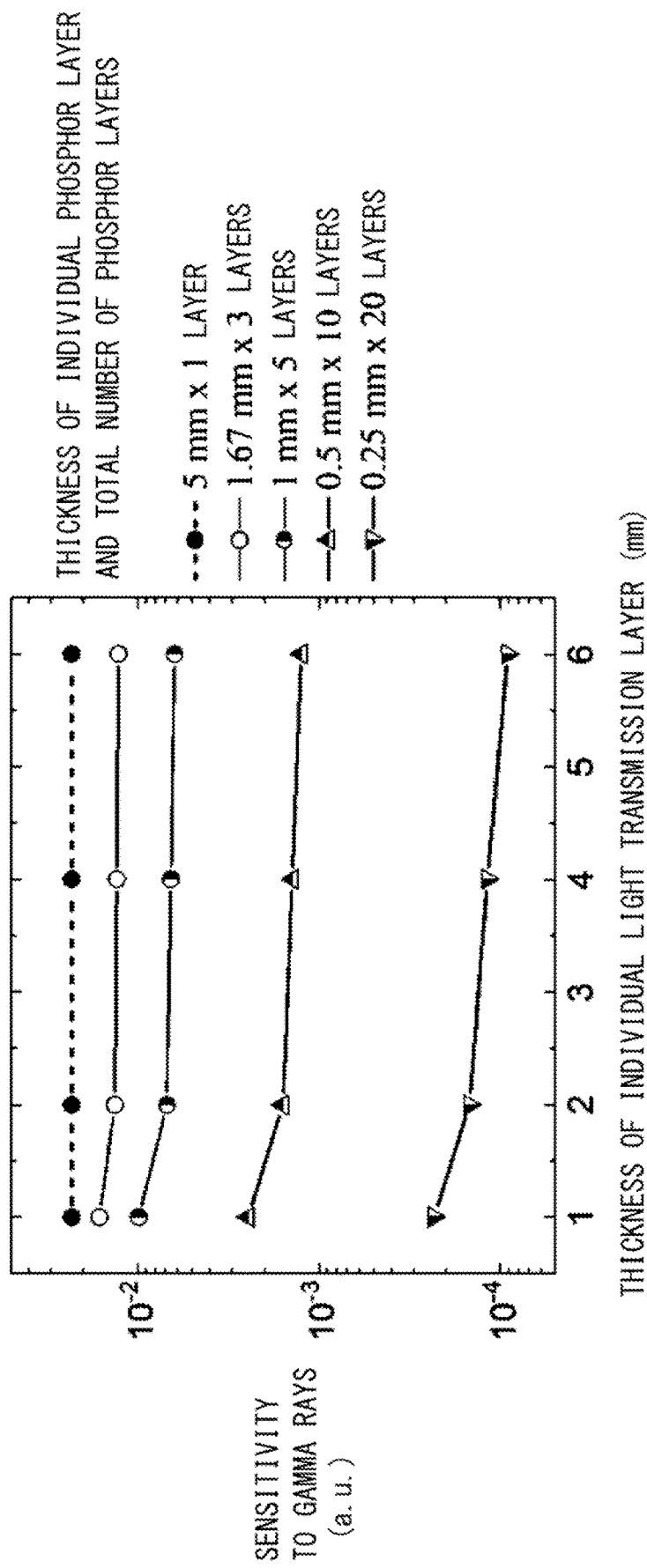
FIG. 8 shows a result of comparing relationships between the sensitivity to 2.2 MeV gamma rays and thickness of a light transmission layer for various phosphor layer thickness with each other, in the scintillator used for the neutron detector according to the first embodiment.
Figure 9:
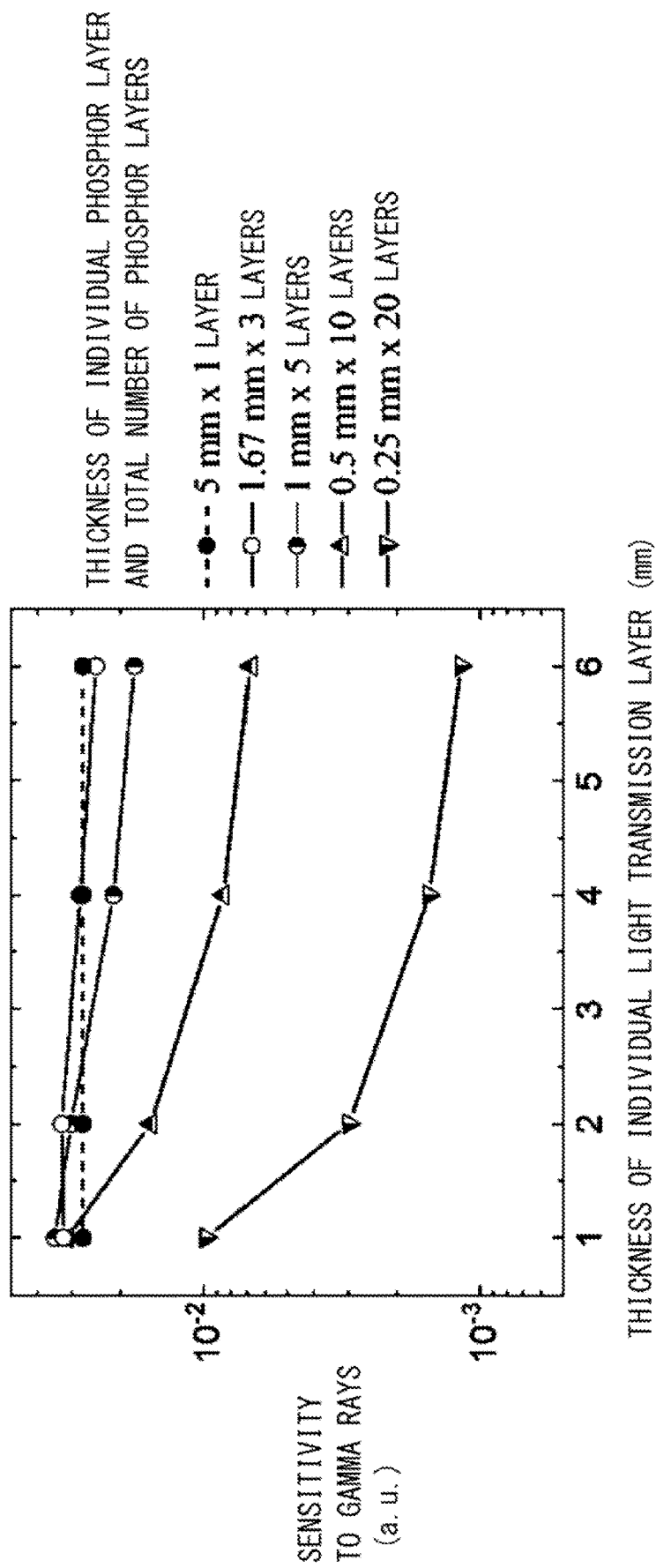
FIG. 9 shows a result of comparing relationships between the sensitivity to 5.0 MeV gamma rays and thickness of a light transmission layer for various phosphor layer thickness with each other, in the scintillator used for the neutron detector according to the first embodiment.

FIGS. 8 and 9 each show a result of calculating the sensitivity to gamma rays when varying the thickness of the light transmission layer 12, where, similarly to the case of FIG. 5, the total thickness of the phosphor layers 11 is fixed at 5 mm, and is distributed to a single layer (with a thickness of 5 mm), among three layers (with each individual layer having a thickness of 1.67 mm), among 5 layers (with each individual layer having a thickness of 1 mm), among 10 layers (with each individual layer having a thickness of 0.5 mm), and among 20 layers (with each individual layer having a thickness of 0.25 mm), and FIGS. 8 and 9 respectively show results for cases of gamma ray energy being 2.2 MeV and 5 MeV. The light transmission layer 12 is assumed to be made of synthetic quartz. Unlike FIG. 5, the vertical axis is represented in a logarithmic scale.

From the results of FIGS. 8 and 9, it is noticed that, in the multilayer structure, the sensitivity to gamma rays (luminescence intensity) decreases with increasing the total thickness of the light transmission layers 12 not contributing to the luminescence. In this respect, when neutron absorption by the light transmission layer 12 can be neglected, the light transmission layer 12 is preferred to be thick in order to reduce the luminescence intensity due to gamma-ray photons. However, while neutron absorption by the light transmission layer 12 is slight, the neutron detection efficiency gradually decreases with increasing the total thickness of the light transmission layers 12. Further, particularly in an aspect shown in FIG. 6B, which will be described later, a photo-sensing area of the photodetector needs to be made large when the light transmission layer 12 is thick, which causes another disadvantage in cost. Therefore, it is undesirable to increase the thickness of the light transmission layer 12 more than necessary, and specifically, the thickness of the light transmission layer 12 is preferred to be about 6 mm (1.3 g/cm$^2$ in terms of density length) or smaller. As shown in FIG. 8, when the phosphor layer 11 is set at 0.25 mm in thickness (0.0625 g/cm$^2$ in terms of density length), sufficient effect of suppressing the sensitivity to 2.2 MeV gamma rays is expected even when the light transmission layer 12 is 1 mm in thickness (0.2 g/cm$^2$ in terms of density length). However, when the phosphor layer 11 is set at 0.25 mm in thickness, the total number of the phosphor layers 11 needs to be made large in order to secure the neutron detection efficiency, which causes broadening of the pulse height distribution in the configuration of FIG. 6A, as described above, and accordingly is undesirable. Even in the case of using the configuration of FIG. 6B, when the light transmission layer 12 is too thin, the light propagation efficiency in the in-plane direction is decreased, which also causes broadening of the pulse height distribution, and accordingly is undesirable in respect of making the distributions D1 and D3 in FIG. 2 apart from each other. Therefore, when expressed in terms of density length as in the above-described case of the phosphor layer 11, a preferred range for the light transmission layer 12 is 0.2 g/cm$^2$ to 1.3 g/cm$^2$.

Meanwhile, in the neutron detector 2 of FIG. 6B, incident directions (arrows C and D) of fluorescent light to be detected by photodetectors are different from that in the case of FIG. 6A by 90 degrees, where two photodetectors, a first photodetector 31A and a second photodetector 31B, opposing each other are used, with the scintillator 10 inserted between them in the y direction. Since luminescence occurring when neutrons are absorbed in the phosphor layer 11 has no specific directionality, and light is emitted in all directions, the emitted light can be detected also by the photodetectors 31A and 31B.

There, light emitted by the leftmost phosphor layer 11 in FIG. 6B and light emitted by the rightmost phosphor layer 11, which have been mentioned earlier, each pass through the phosphor layer 11 having emitted the light and light transmission layers 12 neighboring the phosphor layer 11, along the y direction, and there is no difference between them in path length from their emission to their arrival at the photodetectors 31A and 31B. Accordingly, in the present case, unlike in the case of FIG. 6A, it does not occur that the pulse height differs depending on which one of five phosphor layers 11 has emitted the light (has absorbed neutrons), and as a result, there occurs no broadening of the pulse height distribution due to the employment of the multilayer structure.

On the other hand, when such light absorption or the like in the phosphor layer 11 and the light transmission layer 12 as described above cannot be neglected, it affects the pulse height of output pulses obtained by the photodetectors 31A and 31B. In FIG. 6B, when neutrons are absorbed on the side of the photodetector 31A (upper side in the diagram) in a phosphor layer 11, thus emitted light reaches the photodetector 31A via a short path R3 and does the photodetector 31B via a long path R4. In contrast, when neutrons are absorbed on the side of the photodetector 31B (lower side in the diagram) in a phosphor layer 11, thus emitted light reaches the photodetector 31A via a long path R5 and does the photodetector 31B via a short path R6. Accordingly, in a case where light absorption cannot be neglected, when neutrons are absorbed on the side of the photodetector 31A, the pulse height in the photodetector 31A becomes higher and that in the photodetector 31B becomes lower, relative to each other, and they become in a reverse relation when neutrons are absorbed on the side of the photodetector 31B. That is, there occurs distribution in the pulse height of output pulses in each of the photodetectors 31A and 31B depending on the neutron incident position in the y direction.

In this respect, in the neutron detector 2, an output pulse of the photodetector 31A (first output pulse) $P_A$ and that of the photodetector 31B (second output pulse) $P_B$ are input to a coincidence counting circuit (coincidence counting unit) 32. When it recognizes the output pulse $P_A$ and the output pulse $P_B$ simultaneously, the coincidence counting circuit 32 outputs their sum $P_A+P_B$. The pulse height of $P_A+P_B$ is almost independent of the neutron incident position in the y direction, and corresponds to the energy absorbed by neutron absorption in the phosphor layer 11. Accordingly, by using such a coincidence counting circuit 32 and thereby obtaining output pulses independent of the neutron incident position in the y direction, even in a case where light absorption occurs in the phosphor layer 11, it is possible to suppress broadening of the pulse height distribution in neutron detection. As a result, discrimination between neutrons and gamma rays becomes easy to perform. However, since decay of light due to absorption relates nonlinearly with the distance from the incident position to the photodetector, for example, a simple sum of $P_A$ and $P_B$ is not exactly a quantity independent of the incident position. More exactly, it is preferable to use a pulse height independent of the incident position appropriately calculated using $P_A$ and $P_B$ with the above-described point taken into consideration. Here, the coincidence counting circuit 32 may be configured in the form of an electric circuit, or may be configured using a computer or the like that performs processing on digitized output pulses. Particularly, in the case of using a computer, the processing does not necessarily need to be performed in real time at the time of detection, and may be performed by the computer collectively on a series of output pulse data after storing the data during a certain time period, for example. In that case, the processing may be performed in an offline state separated from the measurement environment by arranging the coincidence counting circuit 32 apart from the photodetectors and the like.

Further, even in the configuration of FIG. 6B, by providing photodetectors 31A in the form of an array along the x direction, similarly providing photodetectors 31B, and providing coincidence counting circuits 32 in accordance with the photodetectors, for example, neutron absorption positions (luminescence positions) in the x direction can be recognized.

In the configuration of FIG. 6B, since fluorescent light generated by neutron absorption theoretically is always detected by the photodetectors 31A and 31B at the same time, a noise component irrelevant to detection of radiation such as neutrons is removed from outputs of the photodetectors 31A and 31B and is not included in the output of the coincidence counting circuit 32, unless its simultaneous output occurs accidentally. Here, with respect to synchronicity of outputs from the photodetectors 31A and 31B in the coincidence counting circuit 32, those both of which occur within an appropriately determined short time period are recognized to be synchronous with each other.

In the case as shown in FIG. 6B where light emitted along the y direction is detected by the photodetectors, when absorption of the light in the phosphor layer 11 can be neglected, a configuration not including the coincidence counting circuit 32 in FIG. 6B and including only either of the photodetectors 31A and 31B may be employed. Further, it is particularly effective to employ a configuration as described earlier, the phosphor layers 11 are formed to be thin in the z direction, and the light transmission layers 12 thicker than the phosphor layers 11 are provided adjacent to the respective phosphor layers 11, thereby enabling detection of not only light propagating in the phosphor layers 11 but also light propagating in the light transmission layers 12, along the y direction.

Second Embodiment

Figure 10:
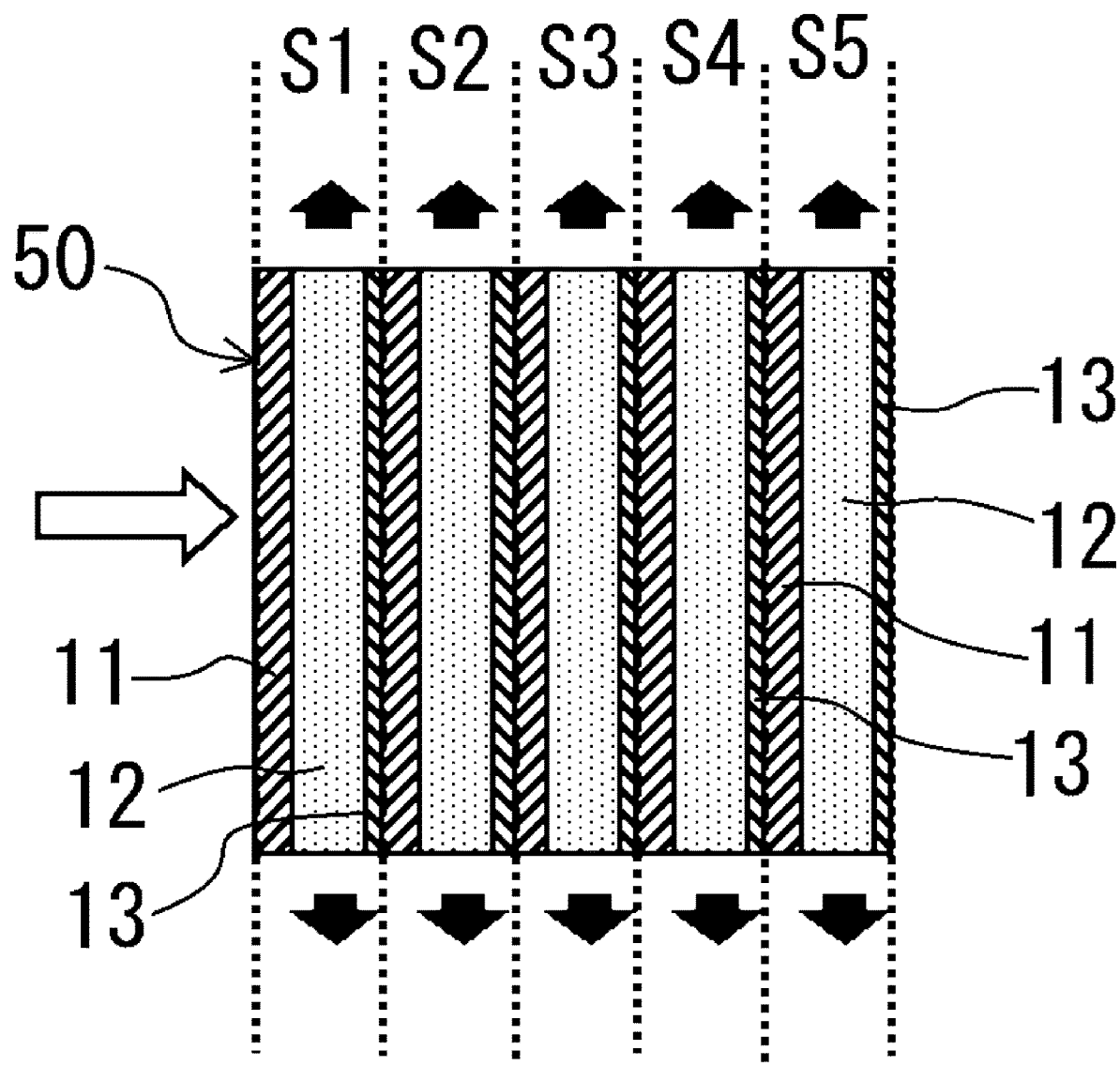
FIG. 10 is a cross-sectional view showing a structure of a scintillator used in a neutron detector according to a second embodiment of the present invention.

Next, a description will be given of a second embodiment that uses a scintillator having a different structure from that of the scintillator 10 shown in FIGS. 1A, 1B. FIG. 10 is a cross-sectional view showing a structure of such a scintillator 50 used in the present embodiment, which corresponds to FIG. 1B. In the scintillator 50, it is the same as in the scintillator 10 that five phosphor layers 11 and five light transmission layers 12 are provided, and that the phosphor layers 11 emit fluorescent light by interacting with neutrons (or gamma rays).

However, in the present case, a thin light shielding layer 13 that does not transmit but does reflect fluorescent light is formed on the right side of each of the light transmission layers 12 in the diagram. It is preferable that the light shielding layer 13 is made of a material not transmitting the fluorescent light but negligibly absorbing neutrons (for example, such as aluminum). In general, it is difficult to absorb neutrons but easy to shield visible light and ultraviolet light by using a thin metal, and it accordingly is easy to provide such a light shielding layer 13. Further, energy of gamma rays or of high-energy electrons generated by gamma rays may be absorbed by the light shielding layer 13. Meanwhile, in the scintillator 50, light detection is performed in terms of each of segments, as will be described later, where the light shielding layer 13 serves as a boundary between the segments. There, the thickness of the light shielding layer 13 may be set thick in order to facilitate the light detection in terms of each segment. Such setting is also easy because neutron absorption by aluminum or the like, for example, is slight.

In FIG. 10, light emitted by one phosphor layer 11 enters the adjacent light transmission layer 12, but its incidence on a phosphor layer 11 next to the adjacent light transmission layer 12 is prevented by the light shielding layer 13. Accordingly, the scintillator 50 is divided into five segments S1 to S5 in the z direction with the light shielding layer 13 being each boundary, with respect to fluorescent light. In FIG. 10, one phosphor layer 11 and one light transmission layer 12 are provided in each segment, and light emitted by one of the phosphor layers 11 progresses only within the segment including the phosphor layer 11 particularly along the y direction. Further, because of the existence of the light shielding layer 13, light emitted by the phosphor layer 11 is sent out only in the directions of arrows C and D illustrated in FIG. 6B, but not in the direction of an arrow B in FIG. 6A.

Here, similarly to the case of FIG. 1, the number of laminated layers including the phosphor layers 11 and the like is appropriately set in practice. Further, while each segment is composed of one phosphor layer 11 and one light transmission layer 12 in the example of FIG. 10, a plurality of phosphor layers 11 and a plurality of light transmission layers 12 may be provided in each segment (each of regions separated by the light shielding layers 13).

As described above, in contrast to that absorption of a single neutron causes luminescence only in a single phosphor layer 11, a single gamma-ray photon may cause luminescence in more than one phosphor layers 11. In this respect, when the segments S1 to S5 are arranged as in the structure of FIG. 10 and detection of luminescence is thereby performed in terms of each of the segments, influence of luminescence in other segments is removed with respect to luminescence due to gamma-ray photons, which enables further reduction of luminescence intensity due to gamma-ray photons.

Figure 11:
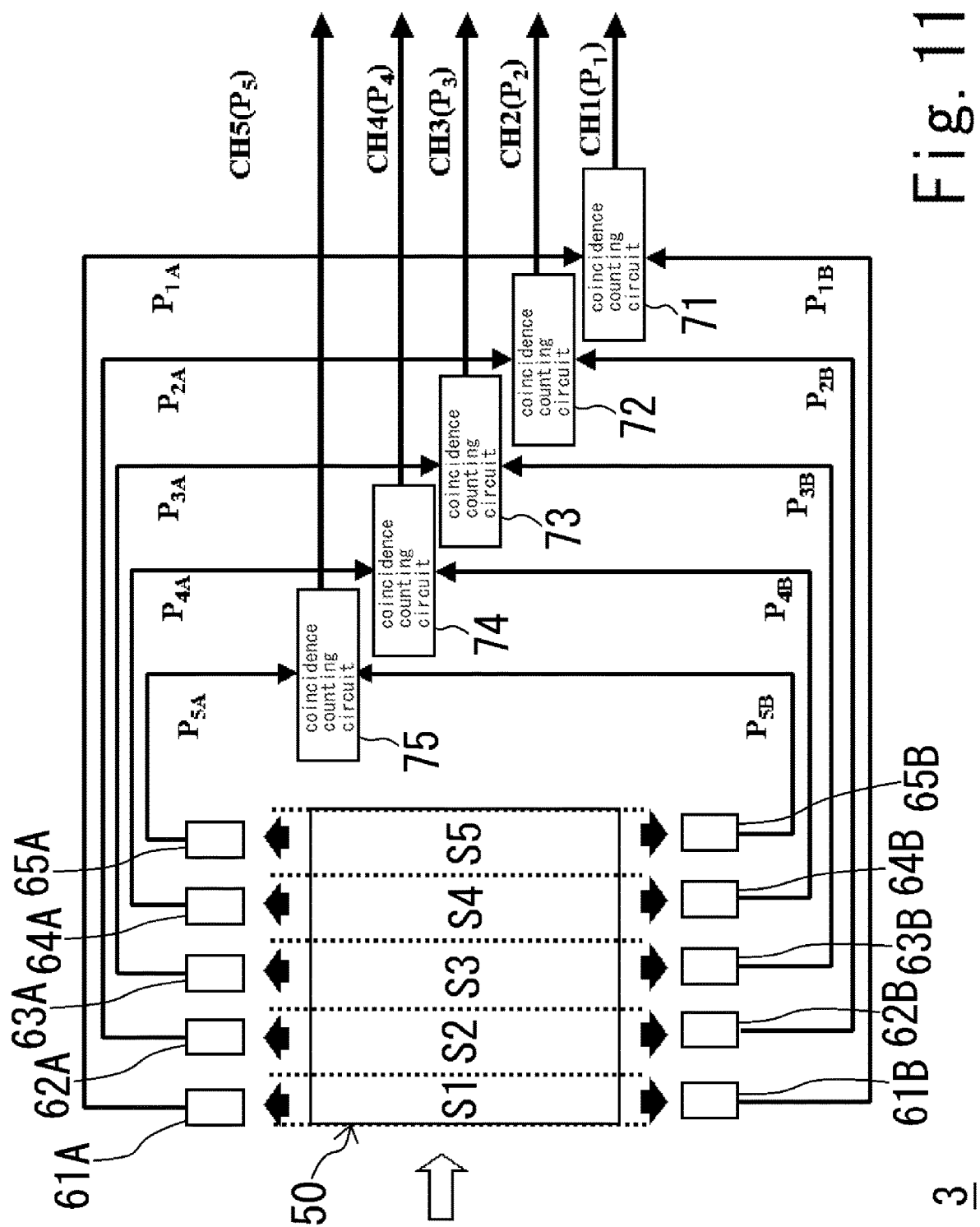
FIG. 11 is a diagram showing a configuration of a neutron detector according to the second embodiment.

In the present case, the scintillator 50 cannot be used in place of the scintillator 10 in FIG. 6A because light cannot be extracted in the direction of the arrow B of FIG. 6A, but it can be used in place of the scintillator 10 in FIG. 6B. In addition, the scintillator 50 can be used in a different aspect from that of FIG. 6B. FIG. 11 shows a configuration of such a neutron detector 3 in a manner of corresponding to FIG. 6B. There, the scintillator 50 is depicted in a simplified manner where it is represented by only the segments S1 to S5.

In the configuration, in a manner of corresponding to the photodetectors 31A and 31B in FIG. 6B, photodetectors 61A and 61B are provided in the segment S1, photodetectors 62A and 62B in the segment S2, photodetectors 63A and 63B in the segment S3, photodetectors 64A and 64B in the segment S4, and photodetectors 65A and 65B in the segment S5. Further, in a manner of corresponding to the coincidence counting circuit 32 in FIG. 6B, outputs $P_{1A}$ and $P_{1B}$ of the photodetectors 61A and 61B are input to a coincidence counting circuit (coincidence counting unit) 71, outputs $P_{2A}$ and $P_{2B}$ of the photodetectors 62A and 62B to a coincidence counting circuit (coincidence counting unit) 72, outputs $P_{3A}$ and $P_{3B}$ of the photodetectors 63A and 63B to a coincidence counting circuit (coincidence counting unit) 73, outputs $P_{4A}$ and PAB of the photodetectors 64A and 64B to a coincidence counting circuit (coincidence counting unit) 74, and outputs $P_{5A}$ and $P_{5B}$ of the photodetectors 65A and 65B to a coincidence counting circuit (coincidence counting unit) 75.

Accordingly, the coincidence counting circuit 71 outputs $P_1$ that is a sum of the output pulses $P_{1A}$ and $P_{1B}$ recognized to be synchronous in the photodetectors 61A and 61B, and similarly, the coincidence counting circuits 72 to 75 respectively output $P_2$ to $P_5$ each of which is a sum of output pulses of two photodetectors connected to the corresponding one of the coincidence counting circuits. That is, in the neutron detector 3, the configuration of the neutron detector 2 of FIG. 6B is implemented in each of the segments, and $P_1$ to $P_5$ are obtained as outputs from respective ones of different channels. Here, $P_1$ (and the like) does not necessarily need to be determined to be a sum of $P_{1A}$ and $P_{1B}$ (and the like) as described above, but a value of $P_1$ (and the like) may be appropriately calculated from $P_{1A}$ and $P_{1B}$ (and the like) by making correction on a nonlinear component independent of incident positions and then be used.

Thus, in the case of using the scintillator 50 of FIG. 10, the output pulses $P_1$ to $P_5$ respectively corresponding to the segments S1 to S5 are extracted from respective ones of different channels CH1 to CH5, where $P_A+P_B$ extracted as an output in FIG. 6B corresponds to each of $P_1$ to $P_5$ in the present case.

Figure 12:
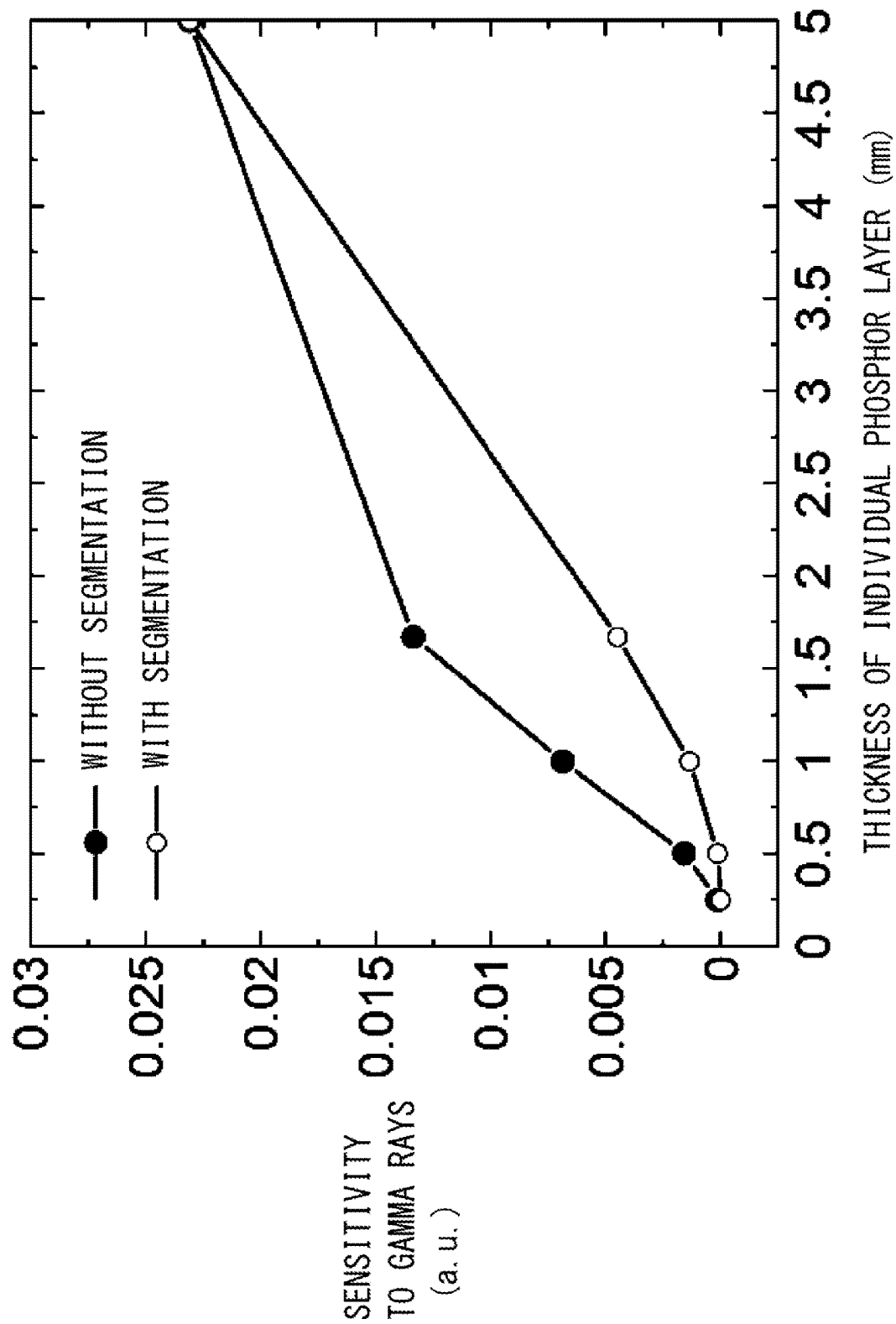
FIG. 12 shows a result of comparing a relationship between the sensitivity to 2.2 MeV gamma rays and thickness of a phosphor layer when segmentation is adopted and the relationship when segmentation is not adopted, in the scintillator used for the neutron detector according to the second embodiment.

FIG. 12 shows a result of calculation performed in respect of that the luminescence intensity due to gamma-ray photons can be particularly reduced in the configuration of FIG. 11, in a manner of corresponding to FIG. 5. Shown there is the sensitivity to gamma rays when the number of phosphor layers 11 (or the thickness of each individual layer) is varied, while keeping the total thickness of the phosphor layers 11 constant, in terms of with or without segmentation.

In FIG. 12, with respect to the above-described result of FIG. 5 on the scintillator 10 (the sensitivity to gamma rays of 2.2 MeV), a result of performing similar calculation on the scintillator 50 obtained by applying segmentation to the scintillator 10 using the light shielding layers 13 (with segmentation) is shown, along with the result of FIG. 5 (without segmentation). There, the case of 5 mm thickness corresponds to that of using only a single phosphor layer 11, and accordingly the case is practically identical for both with and without segmentation. For the cases of the multilayer structure, a calculation result on the first one of the phosphor layers 11 (segment S1), whose luminescence intensity (energy absorption) due to gamma-ray photons is highest, is shown. It is noticed from the result that, when the segmentation is applied, the luminescence intensity due to gamma-ray photons can be greatly reduced, compared to the cases without segmentation, particularly in the cases of a larger number of thinner phosphor layers 11. On the other hand, when absorption of neutron energy by the light shielding layer 13 can be neglected, the luminescence intensity due to neutron absorption is the same as that in the scintillator 10. As a result, the n/r discrimination ability can be particularly increased by using the configuration of FIG. 11.

In the configuration of FIG. 11, since outputs are extracted from the five channels (CH1 to CH5), neutron discrimination and detection may be performed in terms of each of the channels, where the discrimination is particularly easily performed. In addition, when outputs are thus extracted separately from the five channels, for example, the counting rate of each segment is reduced, and accordingly the configuration is also effective in a high dose condition. Further, the configuration is also effective in a case where precise measurement of the speed of neutrons is required, such as in neutron TOF measurement, because it is possible to recognize in which phosphor layer (segment) neutrons have undergone reaction, which reduces uncertainty in the distance.

Figure 13:
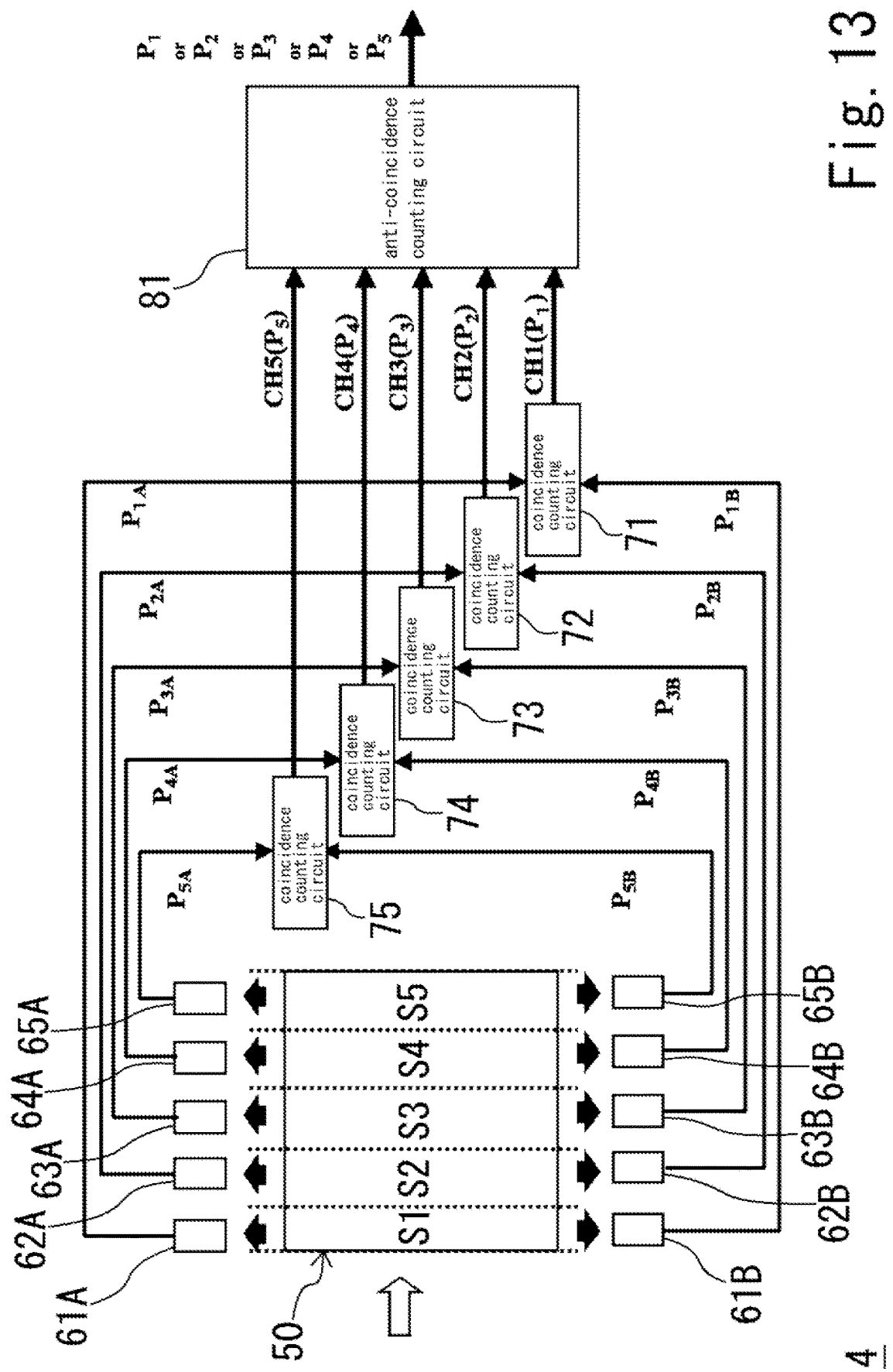
FIG. 13 is a diagram showing a configuration of a modification of the neutron detector according to the second embodiment.

FIG. 13 shows a configuration of a neutron detector 4 corresponding to a modification of the neutron detector 3 of FIG. 11. In contrast to the case of the neutron detector 3 of FIG. 11 where outputs are extracted for respective ones of the five channels, an anti-coincidence counting circuit (anti-coincidence counting unit) 81 is used for generating a single output in the neutron detector 4.

The anti-coincidence counting circuit 81 accepts CH1 ($P_1$) to CH5 ($P_5$) and outputs only one of them whose synchronicity has not been recognized, inversely to the coincidence counting circuit 32 described above. Accordingly, any one of P$_1$ to P$_5$ is output from the anti-coincidence counting circuit 81. That this output's synchronicity has not been recognized means that none of other segments than the segment corresponding to the output pulse to be output (P$_1$ to P$_5$) has emitted light simultaneously with the corresponding segment. While discrimination between neutrons and gamma-ray photons is performed based on the pulse height, as already described, gamma-ray photons may cause simultaneous luminescence in more than one of the segments, and accordingly the use of the anti-coincidence counting circuit 81 also enables suppression of detecting gamma rays and further increasing of the n/γ discrimination ability. It is the same as the case of the coincidence counting circuit 32 described earlier that the anti-coincidence counting circuit 81 may be configured using a computer, and that the computer's processing does not necessarily need to be performed in real time but may be performed in an offline state. Particularly in a high dose condition, the probability that more than one signals are counted accidentally at the same time in each segment increases, to which attention needs to be paid when using the anti-coincidence counting circuit 81.

Figure 14:
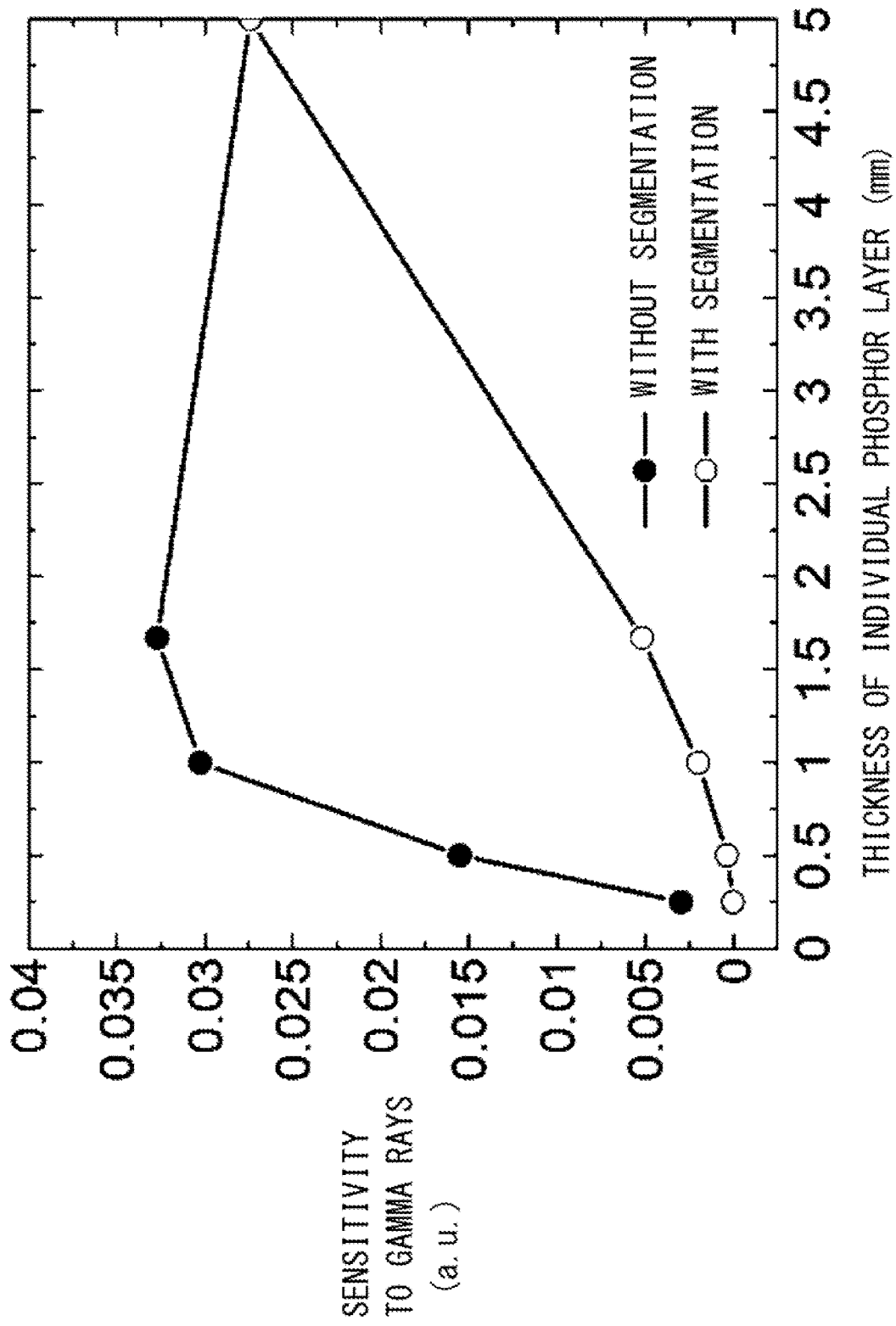
FIG. 14 shows a result of comparing a relationship between the sensitivity to 5.0 MeV gamma rays and thickness of a phosphor layer when segmentation is adopted and the relationship when segmentation is not adopted, in the scintillator used for the neutron detector according to the second embodiment.

The above-described effect of the segmentation varies depending on the energy of gamma rays. FIG. 14 shows a result of calculation for gamma rays of 5.0 MeV performed in a similar way to that performed for obtaining the result for gamma rays of 2.2 MeV shown in FIG. 12. When incident gamma rays are of high energy, the probability is high that high-energy electrons scattered in a phosphor layer 11 penetrate through the phosphor layer 11, subsequently penetrate through also a light transmission layer 12, and then enter a phosphor layer 11 located next to the light transmission layer 12, thus contributing to luminescence therein. Additionally, the probability is very high that high-energy electrons scattered in a light transmission layer 12 are not completely absorbed in the light transmission layer 12 and are absorbed also in a phosphor layer located next to the light transmission layer 12. For this reason, in the case without segmentation in FIG. 14, the sensitivity to gamma rays is higher when the thickness of the phosphor layer 11 is 1 mm (0.25 g/cm$^2$ in terms of density length) or 1.67 mm (0.42 g/cm$^2$ in terms of density length) than when it is 5 mm (1.25 g/cm$^2$ in terms of density length) (prior art). However, when the segmentation is adopted, luminescence occurring in a plurality of phosphor layers 11 separately generates output of each segment, and accordingly output of each segment decreases and the sensitivity is greatly reduced. Therefore, the effect of segmentation is larger when the energy of gamma rays is higher. Further, for such high-energy gamma rays, the above-described anti-coincidence counting circuit 81 is particularly effective.

In the second embodiment, a preferred range of the thickness (density length) of the phosphor layer 11 is the same as that in the first embodiment. On the other hand, in the case of the second embodiment, since fluorescent light does not propagate between segments, restriction on the thickness (density length) of the light transmission layer 12 is relaxed. However, in the second embodiment, when each segment: is thick, a photo-sensing area of the photodetectors needs to be large, which causes a disadvantage in cost. Therefore, it is undesirable to make the light transmission layer 12 thicker than necessary, and is preferable to make the thickness about 6 mm (1.3 g/cm$^2$ in terms of density length) or smaller.

In the second embodiment, while the light transmission layer 12 has a function to propagate fluorescent light to the photodetectors, also the phosphor layer 11 can similarly guide fluorescent light to the photodetectors, and accordingly, particularly when the segmentation is adopted, the light transmission layer 12 does not necessarily be provided in the segments. However, since the phosphor layer 11 is set to be thin as described above, its efficiency of propagating light (fluorescent light) to the photodetectors is not high in the in-plane direction. In this respect also, it is preferable to provide also the light transmission layer 12 in the segments.

In the technology described in Patent Document 2, inorganic phosphor particles and a resin material are used, and it may be considered that the inorganic phosphor particles correspond to the phosphor layer 11 and a layer made of the resin material corresponds to the light transmission layer 12. However, unlike in the light transmission layer 12 described above, the probability that neutrons are scattered and thereby thermalized or absorbed in the resin material containing hydrogen is high, and as a result, the neutron detection efficiency in the prior technology is lower than that of the present invention. In addition, while the inorganic phosphor particles and the resin material are generally made of completely different materials, their densities are required to be close to each other in order to uniformly mix them. Under such a condition, to further make their refractive indices close to each other in order to suppress reflection at an interface between them as in the case of between the phosphor layer 11 and the light transmission layer 12 in the present invention, restriction on the resin material or the material for the inorganic phosphor particles becomes tight. Therefore, it is not easy to select and use such materials in practice. In contrast, in the present invention, such restriction is not placed on densities of the phosphor layer 11 and the light transmission layer 12, and accordingly the degree of freedom of material selection is high.

Furthermore, in the case of the present invention, by forming the phosphor layer 11 to have a thin film form with a small thickness in the incident direction of gamma rays (neutrons) and employing the layered structure, the sensitivity to gamma rays can be greatly reduced without reducing that to neutrons, as described above, but in contrast, in the technology described in Patent Document 2, since the size of the inorganic phosphor particles is isotropic and independent of the incident direction, the effect of reducing the sensitivity to gamma rays without reducing that to neutrons is small.

Here, as long as the same operation can be performed, a specific configuration of the neutron detector is optional. For example, as long as the same functions as that described above are possible, any combination may be used for the phosphor layer and the light transmission layer, and a main component may be different between the layers. Further, a configuration of the photodetectors may be appropriately set.

REFERENCE SIGNS LIST 1 to 4: neutron detector
10, 50, 100: scintillator
11: phosphor layer
12: light transmission layer
13: light shielding layer
21: photodetector
31A, 61A, 62A, 63A, 64A, 65A: photodetector (first photodetector)
31B, 61B, 62B, 63B, 64B, 65B: photodetector (second photodetector)

32, 71 to 75: coincidence counting circuit (coincidence counting unit)
81: anti-coincidence counting circuit (anti-coincidence counting unit)
S1 to S5: segment

What is claimed is:

1. A neutron detector that detects neutrons by fluorescent light emitted when the neutrons are absorbed in a phosphor, the phosphor containing a neutron-absorbing isotope that emits secondary charged particles by absorbing the neutrons, the neutron detector comprising:
a scintillator configured to have a layered structure consisting of, along an incident direction of the neutrons, a plurality of combinations of a thin-film form phosphor layer made of the phosphor and a thin-film form light transmission layer made of a light transmitting material transmitting the fluorescent light and being adjacent to the phosphor layer in the thickness direction; and
a photodetector configured to issue an output pulse as output generated on detecting the fluorescent light.

2. The neutron detector according to claim 1,
wherein the photodetector detects the fluorescent light emitted by the scintillator along the incident direction.

3. The neutron detector according to claim 1,
wherein the photodetector detects the fluorescent light emitted by the scintillator along an in-plane direction of the phosphor layers and the light transmission layers.

4. The neutron detector according to claim 3, comprising:
as the photodetector, a first photodetector and a second photodetector opposing each other along the in-plane direction, with the scintillator inserted between them; and
a coincidence counting unit configured to newly output, as the output pulse, an output based on a first output pulse corresponding to the output pulse from the first photodetector and a second output pulse corresponding to the output pulse from the second photodetector when synchronicity is recognized between the first and second output pulses.

5. The neutron detector according to claim 3,
wherein:
in the scintillator,
a plurality of segments, each composed of a combination of the phosphor layer and the light transmission layer neighboring the phosphor layer and transmitting the fluorescent light emitted by the phosphor layer, are formed along the incident direction, and,
in the layered structure, a light shielding layer to shield the fluorescent light is provided between the segments neighboring each other in the incident direction so that the fluorescent light within a segment propagates in the in-plane direction but does not propagate between neighboring segments; and
the photodetectors are provided in terms of each of the segments.

6. The neutron detector according to claim 4,
wherein:
in the scintillator,
a plurality of segments, each composed of a combination of the phosphor layer and the light transmission layer neighboring the phosphor layer and transmitting the fluorescent light emitted by the phosphor layer, are formed along the incident direction, and,
in the layered structure, a light shielding layer to shield the fluorescent light is provided between the segments neighboring each other in the incident direction so that the fluorescent light within a segment propagates in the in-plane direction but does not propagate between neighboring segments; and
the photodetectors are provided in terms of each of the segments.

7. The neutron detector according to claim 5, comprising
an anti-coincidence counting unit configured to output, among the output pulses from the respective segments, the output pulse whose synchronicity with other ones of the output pulses has not been recognized.

8. The neutron detector according to claim 6, comprising
an anti-coincidence counting unit configured to output, among the output pulses from the respective segments, the output pulse whose synchronicity with other ones of the output pulses has not been recognized.

9. The neutron detector according to any one of claim 1,
wherein a ratio of the light transmission layer to the phosphor layer in refractive index for the fluorescent light is in a range from 0.90 to 1.10.

10. The neutron detector according to any one of claim 1,
wherein a main component of the phosphor layer and that of the light transmission layer are silicon dioxide ($SiO_2$), and the neutron-absorbing isotope is added in the phosphor layer.

11. The neutron detector according to claim 10,
wherein the neutron-absorbing isotope is $^6$Li or $^{10}$B.

12. The neutron detector according to any one of claim 1,
wherein a density length corresponding to the product of density and thickness is set in a range from 0.0625 to 0.5 g/cm$^2$ and in a range from 0.2 to 1.3 g/cm$^2$, respectively, for the phosphor layer and the light transmission layer.

* * * * *

UNITED STATES PATENT AND TRADEMARK OFFICE
CERTIFICATE OF CORRECTION

| | | |
|---|---|---|
| PATENT NO. | : 12,196,899 B2 | Page 1 of 1 |
| APPLICATION NO. | : 18/086818 | |
| DATED | : January 14, 2025 | |
| INVENTOR(S) | : Fumiaki Ito et al. | |

It is certified that error appears in the above-identified patent and that said Letters Patent is hereby corrected as shown below:

On the Title Page

Under Item "(72) Inventors", correct the address of inventor Kota HIRONA as follows:
Kota HIRONA, Tokai-mura (JP)

Signed and Sealed this
Fourteenth Day of October, 2025

John A. Squires
*Director of the United States Patent and Trademark Office*